US011255760B2

(12) United States Patent
Scialo et al.

(10) Patent No.: US 11,255,760 B2
(45) Date of Patent: Feb. 22, 2022

(54) PARTICLE SAMPLING SYSTEMS AND METHODS FOR ROBOTIC CONTROLLED MANUFACTURING BARRIER SYSTEMS

(71) Applicant: Particle Measuring Systems, Inc., Boulder, CO (US)

(72) Inventors: Giovanni Scialo, Frascati (IT); Davide Recchia, Frascati (IT)

(73) Assignee: PARTICLE MEASURING SYSTEMS, INC., Boulder, CO (US)

( * ) Notice: Subject to any disclaimer, the term of this patent is extended or adjusted under 35 U.S.C. 154(b) by 149 days.

(21) Appl. No.: 16/678,687

(22) Filed: Nov. 8, 2019

(65) Prior Publication Data

US 2020/0158603 A1 May 21, 2020

Related U.S. Application Data

(60) Provisional application No. 62/768,365, filed on Nov. 16, 2018, provisional application No. 62/831,343, filed on Apr. 9, 2019.

(51) Int. Cl.
*G01N 1/22* (2006.01)
*G01N 15/06* (2006.01)
(Continued)

(52) U.S. Cl.
CPC ......... *G01N 1/2247* (2013.01); *G01N 1/2202* (2013.01); *G01N 15/0606* (2013.01);
(Continued)

(58) Field of Classification Search
CPC ............. G01N 1/2247; G01N 15/0606; G01N 2015/0693; G01N 2015/0046; G01N 35/0099; G01N 1/2202
See application file for complete search history.

(56) References Cited

U.S. PATENT DOCUMENTS 3,001,914 A    9/1961   Andersen
3,938,366 A    2/1976   Wertlake et al.
(Continued)

FOREIGN PATENT DOCUMENTS

CN    1218553    6/1999
CN    1275894    12/2000
(Continued)

OTHER PUBLICATIONS

International Search Report and Written Opinion, dated Apr. 1, 2021, corresponding to International Patent Application No. PCT/US2021/013873, 9 pp.
(Continued)

*Primary Examiner* — Benjamin R Schmitt
(74) *Attorney, Agent, or Firm* — Leydig, Voit & Mayer, Ltd.

(57) ABSTRACT

Provided herein are systems and methods allowing for automated sampling and/or analysis of controlled environments, for example, to determine the presence, quantity, size, concentration, viability, species or characteristics of particles within the environment. The described systems and methods may utilize robotics or automation or remove some or all of the collection or analysis steps that are traditionally performed by human operators. The methods and systems described herein are versatile and may be used with known particle sampling and analysis techniques and particle detection devices including, for example, optical particle counters, impingers and impactors.

40 Claims, 15 Drawing Sheets

(51) Int. Cl.
  *G01N 35/00* (2006.01)
  *G01N 15/00* (2006.01)
(52) U.S. Cl.
  CPC . *G01N 35/0099* (2013.01); *G01N 2015/0046* (2013.01); *G01N 2015/0693* (2013.01)

(56) References Cited

U.S. PATENT DOCUMENTS

| | | |
|---|---|---|
| 4,594,715 A | 6/1986 | Knollenberg |
| 4,798,465 A | 1/1989 | Knollenberg |
| 4,827,779 A | 5/1989 | Marple et al. |
| 4,893,928 A | 1/1990 | Knollenberg |
| 5,032,721 A | 7/1991 | Bacon et al. |
| 5,095,206 A | 3/1992 | Bacon, Jr. et al. |
| 5,234,838 A | 8/1993 | Bacon, Jr. |
| 5,282,151 A | 1/1994 | Knollenberg |
| 5,283,199 A | 2/1994 | Bacon, Jr. et al. |
| 5,671,046 A | 9/1997 | Knowlton |
| 5,693,895 A | 12/1997 | Baxter |
| 5,726,753 A | 3/1998 | Sandberg |
| 5,751,422 A | 5/1998 | Mitchell |
| 5,805,281 A | 9/1998 | Knowlton et al. |
| 5,861,950 A | 1/1999 | Knowlton |
| 5,889,589 A | 3/1999 | Sandberg |
| 5,903,338 A | 5/1999 | Mavliev et al. |
| 6,040,153 A | 3/2000 | Lemonnier |
| 6,094,997 A | 8/2000 | Lemonnier |
| 6,167,107 A | 12/2000 | Bates |
| 6,240,768 B1 | 6/2001 | Lemonnier |
| 6,246,474 B1 | 6/2001 | Cerni et al. |
| 6,275,290 B1 | 8/2001 | Cerni et al. |
| 6,435,043 B1 | 8/2002 | Ferguson et al. |
| 6,472,203 B1 | 10/2002 | Gallup et al. |
| 6,615,679 B1 | 9/2003 | Knollenberg et al. |
| 6,651,404 B1 | 11/2003 | Hertfelder |
| 6,709,311 B2 | 3/2004 | Cerni |
| 6,859,277 B2 | 2/2005 | Wagner et al. |
| 6,903,818 B2 | 6/2005 | Cerni et al. |
| 6,928,892 B2 | 8/2005 | Storbeck et al. |
| 6,945,090 B2 | 9/2005 | Rodier |
| 7,030,980 B1 | 4/2006 | Sehler et al. |
| 7,088,446 B2 | 8/2006 | Cerni |
| 7,088,447 B1 | 8/2006 | Bates et al. |
| 7,192,734 B2 | 3/2007 | Ohresser |
| 7,208,123 B2 | 4/2007 | Knollenberg et al. |
| 7,235,214 B2 | 6/2007 | Rodier et al. |
| RE39,783 E | 8/2007 | Cerni et al. |
| 7,334,453 B2 | 2/2008 | Trakumas et al. |
| 7,456,960 B2 | 11/2008 | Cerni et al. |
| 7,576,857 B2 | 8/2009 | Wagner |
| 7,667,839 B2 | 2/2010 | Bates |
| 7,745,469 B2 | 6/2010 | Dahmen et al. |
| 7,746,469 B2 | 6/2010 | Shamir et al. |
| 7,752,930 B2 | 7/2010 | Kreikebaum et al. |
| 7,796,255 B2 | 9/2010 | Miller |
| 7,916,293 B2 | 3/2011 | Mitchell et al. |
| 7,973,929 B2 | 7/2011 | Bates |
| 7,985,949 B2 | 7/2011 | Rodier |
| 8,027,035 B2 | 9/2011 | Mitchell et al. |
| 8,109,129 B2 | 2/2012 | Gorbunov |
| 8,154,724 B2 | 4/2012 | Mitchell et al. |
| 8,174,697 B2 | 5/2012 | Mitchell et al. |
| 8,427,642 B2 | 4/2013 | Mitchell et al. |
| 8,474,335 B2 | 7/2013 | Vellutato, Jr. |
| 8,689,648 B1 | 4/2014 | Heff |
| 8,800,383 B2 | 8/2014 | Bates |
| 8,869,593 B2 | 10/2014 | Gorbunov et al. |
| 9,121,845 B2 | 9/2015 | Vellutato, Jr. |
| 9,513,278 B2 | 12/2016 | Vellutato, Jr. |
| 9,592,609 B2 | 3/2017 | LaFary et al. |
| 9,631,222 B2 | 4/2017 | Ketcham et al. |
| 9,638,665 B2 | 5/2017 | Gorbunov |
| 9,682,345 B2 | 6/2017 | Gromala et al. |
| 9,695,458 B2 | 7/2017 | D'antonio et al. |
| 9,808,760 B2 | 11/2017 | Gromala et al. |
| 9,810,558 B2 | 11/2017 | Bates et al. |
| 9,885,640 B2 | 2/2018 | Ketcham et al. |
| 9,933,351 B2 | 4/2018 | Kent et al. |
| 9,989,462 B2 | 6/2018 | Lumpkin et al. |
| 10,060,837 B2 | 8/2018 | Carter |
| D837,397 S | 1/2019 | Vellutato, Jr. |
| 10,197,487 B2 | 2/2019 | Knollenberg et al. |
| D847,365 S | 4/2019 | Vellutato, Jr. |
| 10,309,876 B2 | 6/2019 | Takenaka et al. |
| 10,330,578 B2 | 6/2019 | Manautou et al. |
| 10,345,200 B2 | 7/2019 | Scialo et al. |
| 10,371,620 B2 | 8/2019 | Knollenberg et al. |
| 10,458,990 B1 | 10/2019 | Manautou et al. |
| 10,571,369 B2 | 2/2020 | Vellutato, Jr. |
| 10,684,209 B1 | 6/2020 | Manautou |
| 10,792,694 B2 | 10/2020 | Gorbunov et al. |
| 10,859,487 B2 | 12/2020 | Knollenberg et al. |
| 10,908,059 B2 | 2/2021 | Knollenberg et al. |
| 10,921,229 B2 | 2/2021 | Shamir |
| 10,928,293 B2 | 2/2021 | Knollenberg et al. |
| 10,997,845 B2 | 5/2021 | MacLaughlin et al. |
| 2003/0044771 A1 | 3/2003 | Anderson et al. |
| 2003/0223912 A1* | 12/2003 | Knecht ............... B01L 3/50255 422/400 |
| 2005/0028593 A1 | 2/2005 | Rodier |
| 2006/0272432 A1 | 12/2006 | Belongia et al. |
| 2007/0010007 A1 | 1/2007 | Aysta et al. |
| 2007/0269849 A1 | 11/2007 | Bridenne et al. |
| 2009/0078862 A1 | 3/2009 | Rodier et al. |
| 2009/0190128 A1 | 7/2009 | Cerni et al. |
| 2009/0197299 A1 | 8/2009 | Vargas et al. |
| 2009/0268202 A1 | 10/2009 | Wagner |
| 2010/0062415 A1 | 3/2010 | Schwoebel et al. |
| 2010/0171625 A1 | 7/2010 | Calio |
| 2010/0212436 A1 | 8/2010 | Swenson et al. |
| 2011/0132108 A1 | 6/2011 | Novosselov et al. |
| 2011/0203931 A1 | 8/2011 | Novosselov et al. |
| 2011/0267451 A1 | 11/2011 | Drescher et al. |
| 2011/0301613 A1 | 12/2011 | Green |
| 2013/0084597 A1 | 4/2013 | Rebe |
| 2013/0260396 A1 | 10/2013 | Akcakir |
| 2015/0000595 A1 | 1/2015 | Gorbunov et al. |
| 2015/0075301 A1* | 3/2015 | Scialo ............... G01N 1/2208 73/863.22 |
| 2015/0259723 A1 | 9/2015 | Hartigan et al. |
| 2016/0126081 A1 | 5/2016 | Gorbunov |
| 2016/0139013 A1 | 5/2016 | Gorbunov |
| 2017/0336312 A1 | 11/2017 | Stoeber et al. |
| 2019/0250785 A1 | 8/2019 | Pandolfi et al. |
| 2019/0346345 A1 | 11/2019 | Scialo et al. |
| 2020/0072729 A1 | 3/2020 | Lumpkin et al. |
| 2020/0150017 A1 | 5/2020 | Bates et al. |
| 2020/0150018 A1 | 5/2020 | Shamir |
| 2020/0158603 A1 | 5/2020 | Scialo et al. |
| 2020/0240896 A1 | 7/2020 | Karasikov et al. |
| 2020/0355597 A1 | 11/2020 | Allan et al. |
| 2020/0355599 A1 | 11/2020 | Rodier et al. |
| 2021/0044978 A1 | 2/2021 | Michaelis et al. |
| 2021/0063349 A1 | 3/2021 | Rodier et al. |
| 2021/0102884 A1 | 4/2021 | MacLaughlin et al. |
| 2021/0136722 A1 | 5/2021 | Scialo et al. |
| 2021/0140867 A1 | 5/2021 | Knollenberg et al. |
| 2021/0190659 A1 | 6/2021 | Knollenberg et al. |
| 2021/0208054 A1 | 7/2021 | Ellis et al. |
| 2021/0223273 A1 | 7/2021 | Scialo et al. |

FOREIGN PATENT DOCUMENTS

| | | |
|---|---|---|
| CN | 101528912 | 9/2009 |
| CN | 101680874 | 3/2010 |
| CN | 101755198 | 6/2010 |
| CN | 102220235 | 10/2011 |
| CN | 105829860 | 8/2016 |
| EP | 1175990 | 1/2002 |
| EP | 1460126 A2 | 9/2004 |
| EP | 2279402 | 8/2015 |
| EP | 3025139 | 4/2020 |
| JP | 2000-125843 | 5/2000 |
| JP | 2000337818 | 12/2000 |

(56) References Cited

FOREIGN PATENT DOCUMENTS

| | | |
|---|---|---|
| JP | 2016-525688 | 8/2016 |
| WO | WO 96/05040 | 2/1996 |
| WO | WO 02/24279 | 3/2002 |
| WO | WO 2007/144835 | 12/2007 |
| WO | WO 2011/059444 | 5/2011 |
| WO | WO 2015/013374 | 1/2015 |
| WO | WO 2017/072591 A1 | 5/2017 |
| WO | WO 2018/050889 A2 | 3/2018 |
| WO | WO 2019/210375 | 11/2019 |
| WO | WO 2020/233854 A1 | 11/2020 |

OTHER PUBLICATIONS

Adriani et al. (Feb. 1993) "Combined System for Observations of Tropospheric and Stratospheric Thin Clouds," *Journal of Atmospheric and Oceanic Technology* 10:34-40.

Biswas et al. (1984) "High-velocity inertial impactors," *Environ. Sci. Technol.* 18(8): 611-616.

Chinese Office Action, English translation, and search report, dated Mar. 14, 2018, for corresponding Chinese application No. CN 201480052387.3, 30 pp.

Chinese Second Office Action, English translation, dated Nov. 8, 2018, in Chinese application No. CN 201480052387.3, 20 pp.

Chinese Decision of Rejection, English translation, dated Jul. 30, 2019, for corresponding Chinese application No. CN 201480052387.3, 27 pp.

Chinese Notice of Re-examination English translation, dated Dec. 14, 2020, in Chinese application No. CN 201480052387.3, 23 pp.

Dunkelberg et al. (2009) "Determination of the Efficacy of Sterile Barrier Systems Against Microbial Challenges During Transport and Storage," Infection Control and Hospital Epidemiology 30(2): 179-183.

European Examination Report, dated Jul. 18, 2018 in European application No. 14829610.6, 7 pp.

European Examination Report, dated Jan. 2, 2019 in European application No. 14829610.6, 5 pp.

European Examination Report, dated May 8, 2019 in corresponding European application No. 14829610.6, 7 pp.

Extended European Search Report dated May 22, 2017, for European Patent Application No. 14829610.6, 18 pp.

Extended European Search Report dated Jul. 15, 2020, for European Patent Application No. 20165176.7, 16 pp.

India First Examination Report, dated Jun. 11, 2020, for India Patent Application Serial No. 201617003349, 12 pp.

International Search Report and Written Opinion dated Nov. 6, 2014, for corresponding International Application No. PCT/US2014/047759, 14 pp.

International Search Report and Written Opinion, dated Jan. 27, 2020, corresponding to International Patent Application No. PCT/US2019/060574, 8 pp.

Japanese Final Rejection, English Translation, dated Feb. 5, 2019 in Japanese Application No. 2016-529852, 2 pp.

Japanese Office Action and English translation, dated Apr. 10, 2018, for corresponding Japanese application No. JP 2016-529852, 6 pp.

Japanese Office Action and English translation dated Jul. 28, 2020 for corresponding Japanese application No. 2019-104831, 8 pp.

Japanese Office Action, dated Mar. 23, 2021, corresponding to Japanese Patent Application No. 2019-104831, 2 pp.

Korean Office Action and English machine translation dated Nov. 17, 2020 for corresponding Korean application No. 10-2016-7004698, 5 pp.

Korean Office Action, "Notice of Allowance," dated Dec. 29, 2020, corresponding to Korean Patent Application No. 10-2016-7004698, 3 pp.

Mitchell et al. (Sep. 1959) "Improved Cascade Impactor for . . . Measuring Aerosol Particle Sizes in air pollutants, commercial aerosols or cigarette smoke," *Industrial and Engineering Chemistry* 51 (9): 1039-1042.

Partial Supplemental European Search report dated Feb. 7, 2017, for European Patent Application No. 14829610.6, 8 pp.

Particle Measuring Systems. 'DualCapt'. Datasheet, 2008. Retrieved online. [Retrieved on Oct. 6, 2014],<URL:www.kenelec.eom.au/sitebuilder/products/files/279/dual_capt.pdf>.

U.S. Office Action, dated Aug. 11, 2016, in U.S. Appl. No. 14/338,615, 14 pp.

U.S. Office Action, dated Mar. 10, 2017, in U.S. Appl. No. 14/338,615, 15 pp.

U.S. Office Action, dated Jan. 5, 2018, in U.S. Appl. No. 14/338,615, 16 pp.

U.S. Office Action, dated May 11, 2018, in U.S. Appl. No. 14/338,615, 19 pp.

U.S. Office Action, dated May 1, 2019, in U.S. Appl. No. 14/338,615, 11 pp.

U.S. Office Action, dated Mar. 25, 2021, in U.S. Appl. No. 16/421,227, 6 pp.

U.S. Office Action, dated Jun. 7, 2021, in U.S. Appl. No. 16/421,227.

\* cited by examiner

PARTICLE SAMPLING SYSTEMS AND METHODS FOR ROBOTIC CONTROLLED MANUFACTURING BARRIER SYSTEMS

CROSS-REFERENCE TO RELATED APPLICATIONS

This application claims the benefit of and priority to U.S. Provisional Patent Application Nos. 62/768,365 filed Nov. 16, 2018 and 62/831,343 filed Apr. 9, 2019, each of which is hereby incorporated by reference to the extent not inconsistent herewith.

BACKGROUND OF INVENTION

This invention is in the field of manufacturing barrier systems. This invention relates generally to systems and methods for robotic sampling and counting systems for sampling particles from fluids in controlled environments.

In sterile processing, aseptic manufacturing, and cleanroom environments in a number if industries such as pharmaceuticals, biopharmaceuticals, parenteral drugs and medical devices, and microfabrication among others, maintaining operations under stringent specifications for particulate matter and biological load is required.

In at least some known sterile, aseptic, or cleanroom environments, humans must be present in the environment to perform certain operations. For barrier systems, humans may be required to operate machines, manipulate objects, and otherwise interact with what is positioned inside the barrier system. Humans being present in such environments increases the risk of particulate and biological contamination levels. Increasingly, controlled environment systems are moving towards automated or robotic systems in order to limit or eliminate human interaction. However, many applications requiring controlled environments also require or utilize environmental sampling to ensure that viable and non-viable particles and/or organisms remain below the desired levels.

As requirements for lower viable and non-viable particle concentrations increase because of increased quality standards and governmental regulatory requirements there is a need for advancement in sampling technology in order to reduce false positives and reduce the risk of outside contamination from human interactions within the controlled environment.

It can be seen from the foregoing that there remains a need in the art for particle collection, analysis, and characterization systems for sampling and collecting particles and/or organisms from controlled environments with reduced human interaction in order to reduce the risk of further contamination. These systems may include collection any analysis of particles within components of a robotic restricted access barrier system or other automated controlled environmental processes.

SUMMARY OF THE INVENTION

Provided herein are systems and methods allowing for automated sampling and/or analysis of controlled environments, for example, to determine the presence, quantity, size, concentration, viability, species or characteristics of particles within the environment. The described systems and methods may utilize robotics or automation or remove some or all of the collection or analysis steps that are traditionally performed by human operators. The methods and systems described herein are versatile and may be used with known particle sampling and analysis techniques and devices including, for example, optical particle counters, impingers and impactors.

The provided systems and methods may be useful within controlled environments utilizing a robotic system, for example, robotically controlled restricted access barrier system (RABS) and positive pressure isolator systems. These systems and methods allow for integration with a sampler and/or analyzer in the controlled environment to position, connect, sample and/or analyze the environmental conditions within the controlled environment with little or no human contact, reducing the risk of contamination from particles or organisms present on operators. The described systems and methods may also allow for robotic sterilization of the environment or sampling components to further reduce or eliminate the risk of contamination.

In one aspect, provided is a system for detecting particles in a fluid, the system comprising a particle detection device and a robotic manipulator system. The particle detection device may comprise an inlet for receiving a particle-containing fluid, a sampling region for detecting particles in the fluid, and an outlet for discharging the fluid. The sampling region is in fluid communication with the inlet. The outlet is in fluid communication with the sampling region. The robotic manipulator system is configured to perform at least one of the following steps: transport the particle detection device to the sampling location; remove the particle detection device from the sampling location; and regulate a flow of fluid through the particle detection device.

In some embodiments, the particle detection device is an optical particle counter. In some embodiments, the optical particle counter is a scattered light particle counter, a light extinction optical particle counter or a fluorescent optical particle counter. In some embodiments, the particle detection device is an impinger or a sampling cyclone. In some embodiments, the particle detection device is an impactor In some embodiments, the system may comprise a flow system for flowing the fluid through the particle detection device. In some embodiments, the system may comprise a sterilization system for sterilizing all or part of the particle detection device. In some embodiments, the sterilization system utilizes vaporized hydrogen peroxide, chlorine dioxide, ethylene oxide, moist heat or dry heat to sterilize the particle detection device. In some embodiments, the robotic manipulator system is configured to transport the particle detection device to the sterilization system. In some embodiments, impactor base having a plurality of grooves provided on an outer surface to interface with a working end of the robotic manipulator system.

In some embodiments, the impactor comprises an impactor base having one or more features to allow stacking of a plurality of the impactors. In some embodiments, at least a portion of the impactor is transparent. In some embodiments, the robotic manipulator system comprises an optical detector or an imaging device.

In some embodiments, the robotic manipulator system is configured to expose the inlet of the particle detection device to the fluid. In some embodiments, the robotic manipulator system is configured to collect particles from the particle detection device. In some embodiments, the robotic manipulator system is configured to operate the particle detection device in the absence of physical contact of the particle detection device by a user.

In some embodiments, the impactor includes a collection surface comprising a growth medium for receiving biological particles in the fluid, wherein the robotic manipulator system is configured for transporting the impactor to the sterilization system in a fully assembled configuration for sterilizing the impactor, and wherein the growth medium is present within the impactor during sterilization thereof.

In some embodiments, the robotic manipulator system is configured to connect the particle detection device to the flow system. In some embodiments, the robotic manipulator system is configured to open the inlet to allow for fluid flow into the particle detection device. In some embodiments, the particle detection device comprises a cover for enclosing the inlet, and the robotic manipulator system is configured to remove the cover to allow for fluid to enter the inlet. In some embodiments, the robotic manipulator system is configured to replace the cover to stop the fluid from entering the inlet. In some embodiments, the robotic manipulator system is configured to close the inlet to stop fluid flow into the particle detection device.

In some embodiments, the flow system is located within a cleanroom or aseptic environment, and the robotic manipulator system is configured to sample the particles from the fluid in the absence of a user being physically present in the cleanroom or aseptic environment. In some embodiments, the robotic manipulator system is located inside of the cleanroom or aseptic environment. In some embodiments, the robotic manipulator system is configured to stack and unstack a plurality of impactors.

In one aspect, a method for detecting particles in a fluid is provided. The method may comprise the steps of: exposing the inlet of a particle detection device to a particle-containing fluid; flowing the particle-containing fluid into the inlet; directing the fluid through a sampling region of the device; and discharging the fluid through an outlet of the device. The exposing step and/or the flowing step may be performed by a robotic manipulator system. The method may comprise sterilizing the particle detection device via the robotic manipulator system. In some embodiments, the method may include transporting the particle detection device, via the robotic manipulator system, to a sterilization location for the sterilizing step. After the sterilizing step, the method may include transporting the particle detection device, via the robotic manipulator system, to a sampling location.

In some embodiments, the particle detection device comprises an impactor, and the sterilizing step comprises sterilizing the impactor in a fully assembled configuration. In some embodiments, a collection surface of the impactor remains enclosed during sterilization. In some embodiments, the sterilizing step comprises treating the impactor with vaporized hydrogen peroxide.

In some embodiments, at least some of the particles in the fluid to be sampled are biological particles and the method includes culturing at least a portion of the biological particles received by the impactor, wherein the culturing occurs inside the impactor in a fully assembled impactor. In some embodiments, the method includes optically detecting cultured biological particles via the robotic manipulator system.

In some embodiments, the method includes characterizing the cultured biological particles via optical detection or imaging performed by the robotic manipulator system. In some embodiments, the method includes determining a viability, an identity or both of microorganisms in the cultured biological particles. In some embodiments, the determining step is performed by the robotic manipulator system.

In some embodiments, the flowing step comprises regulating a flow rate of the fluid via the robotic manipulator system. In some embodiments the method includes, prior to the flowing step, connecting the particle detector to a flow system. In some embodiments, the impactor is a single-use device. In some embodiments, the method includes collecting at least a portion of the particles that flow into the inlet. In some embodiments, the collecting step is performed by the robotic manipulator system.

In some embodiments, the robotic manipulator system comprises an imaging device; and wherein the characterizing step is performed via the imaging device. In some embodiments, the fluid originates and/or terminates in a cleanroom or aseptic environment, and the method is performed in the absence of a user being physically present in the cleanroom or aseptic environment. In some embodiments, the exposing step and the flowing step are performed by the robotic manipulator system.

In an aspect, provided is a system for detecting particles in a fluid, the system comprising: i) an optical particle counter comprising: a) a flow chamber for flowing a fluid containing particles along a flow direction through a beam of electromagnetic radiation, b) an optical source, in optical communication with the flow chamber, for providing the beam of electromagnetic radiation; and c) an optical collection system for collecting and directing at least a portion of electromagnetic radiation onto a photodetector; wherein the photodetector produces an electric signal characteristic of the number and/or size of the particles detected; ii) a flow system for flowing at least a portion of the fluid through the flow chamber of the optical particle counter to interact with the beam of electromagnetic radiation; and iii) a robotic control system configured to direct movements for at least one of: providing the optical particle counter to a sampling location; transporting the optical particle counter to and from the sampling location; and regulating a flow rate of the fluid through the flow chamber of the optical particle counter. The optical particle counter may be a scattered light particle counter, a light extinction optical particle counter or a fluorescent optical particle counter.

In an aspect, provided is a system for sampling particles from a fluid, the system comprising: i) an impinger or a sampling cyclone; ii) a flow system for flowing at least a portion of the fluid through the impinger or the sampling cyclone to facilitate receiving at least a portion of the particles in the fluid by the impinger or the sampling cyclone; and iii) a robotic control system configured to direct movements of at least one of: providing the impinger or the sampling cyclone to a sampling location; transporting the impinger or the sampling cyclone to and from the sampling location; and regulating a flow rate of the fluid through the impinger or the sampling cyclone.

In an aspect, provided is a system for sampling particles from a fluid, the system comprising: i) an impactor comprising: a) a sampling head comprising one or more intake apertures for sampling a fluid flow containing particles; and b) an impactor base operationally connected to receive at least a portion of the fluid flow from the sampling head; the impactor base comprising an impact or collection surface for receiving at least a portion of the particles in the fluid flow and an outlet for exhausting the fluid flow; wherein the sampling head and the impactor base are integrated components that engage to enclose the impact surface; and wherein the impactor provides for sampling of the particles and growth of biological particles received on the impact surface without disengaging the sampling head and the impactor base; ii) a flow system for flowing at least a portion of the fluid through impactor to facilitate receiving at least a portion of the particles in the fluid by the impactor; and iii) a robotic control system configured to direct movements of at least one of: providing the impactor to a sampling location; transporting the impactor to and from the sampling location; and regulating a flow rate of the fluid through the impactor device.

The systems described herein may further comprise a sterilization system for sterilizing the optical particle counter, the impactor, the impinger or the sampling cyclone. The sterilization system may utilize vaporized hydrogen peroxide, chlorine dioxide, ethylene oxide, moist heat and dry heat. The robotic control system may be further configured for transporting the optical particle counter, the impactor, the impinger or the sampling cyclone to the sterilization system.

The impactor collection surface may be configured to receive and capture biological particles. The sampling head and the impactor base may engage to entirely enclose the collection surface, including for example, engaging via a substantially airtight seal. The sampling head and the impactor base may each independently comprise a polymer material. The impactor base may have a plurality of grooves provided on an outer surface to allow for effective handling of the impactor by the robotic control system. The impactor base may have one or more features to allow for effective stacking of a plurality of the impactors. At least a portion of the impactor base, sampling head, or both may be optically transparent.

The collection surface may comprise a growth medium for receiving biological particles in the fluid. The robotic control system may further comprise an optical detector or an imaging device. The robotic control system may be further configured to expose the optical particle counter, the impactor, the impinger, the sampling cyclone and/or the collection surface to the fluid. The robotic control system may be further configured to collect particles from the optical particle counter, the impactor, the impinger, the sampling cyclone and/or the collection surface. The robotic control system may be further configured to sample the particles from the fluid in the absence of a user physically contacting the optical particle counter, the impactor, the impinger or the sampling cyclone.

The impactor and/or the collection surface may comprise a growth medium for receiving biological particles in the fluid; wherein the robotic control system is further configured for transporting the particle sampling or counting device to the sterilization system in a fully assembled configuration for sterilizing the particle sampling or counting device; and wherein the growth medium is present within the particle sampling or counting during sterilization thereof.

The robotic control system may be further configured to connect the optical particle counter, the impactor, the impinger or the sampling cyclone to the flow system. The optical particle counter, the impactor, the impinger or the sampling cyclone may further comprise an inlet for receiving the at least a portion of the fluid under flow; wherein the robotic control system is further configured to open the inlet to allow for fluid flow into the optical particle counter, the impactor, the impinger or the sampling cyclone.

The optical particle counter, the impactor, the impinger or the sampling cyclone may further comprise a cover for enclosing the optical particle counter, the impactor, the impinger or the sampling cyclone; wherein the robotic control system is further configured to remove the cover to allow for fluid to contact the optical particle counter, the impactor, the impinger or the sampling cyclone. The robotic control system may be further configured to close the inlet to stop fluid flow into the optical particle counter, the impactor, the impinger or the sampling cyclone. The robotic control system may be further configured to replace the cover to stop fluid from contacting the optical particle counter, the impactor, the impinger or the sampling cyclone.

The flow system may be integrated within a cleanroom or aseptic environment, and wherein the robotic control system is further configured to sample the particles from the fluid under flow in the absence of a user being physically present in the cleanroom or aseptic environment. The robotic control system may be located inside of the cleanroom or aseptic environment, outside of the cleanroom or aseptic environment or partially located both inside and outside of the cleanroom or aseptic environment. The systems described herein may further comprise a plurality of impactors or impingers, wherein the robot controller is further configured to direct movements of the robot for stacking and unstacking the impactors or impingers.

In an aspect, provided in a method for detecting particles in a fluid, the method comprising the steps of: i) providing an optical particle counter comprising: a) a flow chamber for flowing a liquid containing particles along a flow direction through a beam of electromagnetic radiation, b) an optical source, in optical communication with the flow chamber, for providing the beam of electromagnetic radiation; and c) an optical collection system for collecting and directing at least a portion of electromagnetic radiation onto a photodetector; wherein the photodetector produces an electric signal characteristic of the number and/or size of the particles detected; ii) flowing at least a portion of the fluid through the flow chamber of the optical particle counter; and iii) determining the number and/or size of the particles detected based on the electric signal; wherein at least one of the providing step or the flowing step is performed by a system configured for robotic control.

In an aspect, provided is a method for sampling particles from a fluid, the method comprising the steps of: i) providing an impinger or a sampling cyclone; ii) flowing at least a portion of the fluid through the impinge or sampling cyclone; and iii) receiving at least a portion of the particles in the fluid in the impinger or sampling cyclone; wherein at least one of the providing step, flowing step, and receiving step is performed by a system configured for robotic control.

In an aspect, provided is a method for sampling particles from a fluid, the method comprising the steps of: i) providing an impactor comprising: a) a sampling head comprising one or more intake apertures for sampling a fluid flow containing particles; and b) an impactor base operationally connected to receive at least a portion of the fluid flow from the sampling head; the impactor base comprising an impact or collection surface for receiving at least a portion of the particles in the fluid flow and an outlet for exhausting the fluid flow; wherein the sampling head and the impactor base are integrated components that engage to enclose the impact surface; and wherein the impactor provides for sampling of the particles and growth of biological particles received on the impact surface without disengaging the sampling head and the impactor base; ii) flowing at least a portion of the fluid through the sampling head of the impactor; and iii) receiving at least a portion of the particles in the fluid on the impact surface of the impactor base; wherein at least one of the providing step, flowing step, and receiving step is performed by a system configured for robotic control.

In an aspect, provided is a method for sampling particles from a fluid comprising: i) providing a particle sampling or counting device; ii) flowing at least a portion of the fluid through the particle sampling or counting device; and iii) receiving at least a portion of the particles (4) in the fluid (6) in the particle counting or sampling device; wherein at least one of the providing step, flowing step, and receiving step is performed by a system configured for robotic control. The fluid may be the gas in a controlled environment such as air or an inert gas. The particle sampling or counting device may comprise an impactor, an impinger, a sampling cyclone and/or an optical particle counter.

The provided method may further comprise a step of sterilizing at least a portion of the system configured for robotic control, for example, comprising a step of sterilizing the particle sampling or counting device. The particle sampling or counting device may be sterilized in a fully assembled configuration. The providing step may comprise positioning the particle sampling or counting device to a location for the sterilizing step by the system configured for robotic control. The providing step may comprise positioning the particle sampling or counting device for receiving the particles after the sterilizing step by the system configured for robotic control.

The described particle sampling or counting device may comprise: a) a collection surface configured to receive at least a portion of the particles in the fluid; b) a sampling head comprising one or more inlets for receiving at least a portion of the fluid under flow; and c) a base operationally connected to the sampling head to receive at least a portion of the sampled fluid from the sampling head, wherein the base comprises: the collection surface; and a fluid outlet; wherein the sampling head and the base are integrated components that engage to enclose the collection surface; and wherein the flowing step comprises contacting at least a portion of the fluid with the collection surface.

The sampling head and base may engage to entirely enclose the collection surface, for example, via a substantially airtight seal. The sampling head and base may each independently comprise a polymer material. The base may have a plurality of grooves provided on an outer surface of the base to allow for effective handling of the particle sampling or counting device by the system configured for robotic control. The base may have one or more features to allow for effective stacking of a plurality of the particle sampling or counting devices.

At least a portion of the base, the sampling head, or both may be optically transparent. The provided method may further comprise a step of sterilizing the particle sampling or counting device, wherein the collection surface remains enclosed during sterilization, for example, to protect a growth media for capturing biological particles such as agar. The collection surface may comprise a growth medium for receiving biological particles.

The provided method may further comprise a step of sterilizing the particle sampling or counting device in a fully assembled configuration, wherein the collection surface remains enclosed by the sampling head and base during sterilization. The sterilizing step may be performed by treating the fully assembled and enclosed particle sampling or counting device with at least one of: vaporized hydrogen peroxide, chlorine dioxide, ethylene oxide, moist heat, and dry heat.

The provided method may further comprise a step of culturing at least a portion of the biological particles received by the growth medium. The culturing step may allow for optical detection of the biological particles. The culturing step may be carried out without disassembling the fully assembled particle sampling or counting device.

The provided method may further comprise a step of characterizing at least a portion of the grown biological particles by visualization, optical detection, molecular detection (e.g., techniques utilizing polymerase chain reaction (PCR) for biological materials) and/or imaging. The culturing step, the characterizing step, or both may be carried out by the system configured for robotic control. The provided method may further comprise a step of determining the presence of, the viability, an identity or both of microorganisms in the grown biological particles. The determining step may be carried out by the system configured for robotic control.

The described providing step may comprise exposing the particle collection or sampling device to the fluid using the system configured for robotic control. The providing step may comprise exposing the collection surface of the particle collection or sampling device to the fluid using the system configured for robotic control. The flowing step may comprise regulating a flow rate of the fluid by the system configured for robotic control.

The provided method may further comprise a step of removing a cover of the particle sampling or counting device or opening an inlet of the particle counting or sampling device by the system configured for robotic control. The provided method may further comprise a step connecting the particle sampling or counting device to a flow system to allow for flowing the fluid by the system configured for robotic control.

The provided method may further comprise a step of replacing a cover of the particle sampling or counting device or closing an inlet of the particle counting or sampling device by the system configured for robotic control. The provided method may further comprise a step of disconnecting the particle sampling or counting device from a flow system to stop flow of the fluid by the system configured for robotic control. The particle sampling or counting device may be a single use (e.g. disposable) particle counting or sampling device.

The provided method may further comprise a step of collecting at least a portion of the particles received by the particle sampling or counting device and/or the collection surface. The described collecting step may be performed by the system configured for robotic control. The system configured for robotic control may comprise an imaging device.

The provided method may further comprise a step of characterizing the particles performed by the imaging device. The characterizing step may comprise, for example, determining a chemical composition of the particles or determining a particle size distribution of the particles.

The provided method may be performed in the absence of a user physically contacting the particle sampling or counting device. The fluid may originate and/or terminate in a cleanroom or aseptic environment; and wherein the method is performed in the absence of a user being physically present in the cleanroom or aseptic environment. Each of the providing step, flowing step, and/or receiving step, may be performed by the system configured for robotic control.

In an aspect, provided is a system for sampling particles from a fluid, the system comprising: a) a particle sampling or counting device; b) a flow system for flowing at least a portion of the fluid through the particle sampling or counting device to facilitate receiving at least a portion of the particles in the fluid by the particle sampling or counting device; c) a robot; and d) a robot controller for controlling the robot, wherein the robot controller is configured to direct movements of the robot for at least one of: i) providing the particle sampling or counting device to a sampling location; ii) transporting the particle sampling or counting device to and from the sampling location; and iii) regulating a flow rate of the fluid through the particle sampling or counting device.

The particle sampling or counting device may be an impactor, an impinger, a sampling cyclone and/or an optical particle counter. The provided system may further comprise a sterilization system for sterilizing the particle sampling or counting device. The sterilization system may utilize at least one of: vaporized hydrogen peroxide, chlorine dioxide, ethylene dioxide, moist heat, and dry heat. The robotic controller may be further configured to direct movements of the robot for transporting the particle sampling or counting device to or from the sterilization system.

The particle sampling or counting device may comprise: A) a collection surface configured to receive the at least a portion of the particles in the fluid; B) a sampling head comprising one or more inlets for sampling at least a portion of the fluid under flow; and C) a base operationally connected to the sampling head to receive at least a portion of the sampled fluid from the sampling head, wherein the base comprises: a collection surface; and a fluid outlet, wherein the sampling head and the base are integrated components that engage to enclose the collection surface; and wherein the flow system is configured to contact at least a portion of the fluid under flow with the collection surface.

The sampling head and the base may engage to entirely enclose the collection surface. The sampling head and the base may engage via a substantially airtight seal. The sampling head and the base may each independently comprise a polymer material. The sampling head or the base may have a plurality of grooves provided on an outer surface to allow for effective handling of the particle sampling or counting device by the robot. The sampling head or the base may have one or more features to allow for effective stacking of a plurality of the particle sampling or counting devices. At least a portion of each of the base, the sampling head, or both may be optically transparent.

The collection surface may comprise a growth medium (e.g. agar) for receiving biological particles in the fluid under flow. The robot may further comprise an optical detector or an imaging device. The robot controller may be further configured to direct movements of the robot for exposing the particle sampling or counting device and/or collection surface to the fluid. The robot controller may be further configured to direct movements of the robot to collect particles from the particle sampling or counting device and/or collection surface. The robot controller may be further configured to direct movements of the robot to sample the particles from the fluid in the absence of a user physically contacting the particle sampling or counting device.

The provided system may be configured such that the particle sampling or counting device and/or the collection surface comprises a growth medium for receiving biological particles in the fluid; wherein the robot controller is further configured to direct movements of the robot for transporting the particle sampling or counting device to the sterilization system in a fully assembled configuration for sterilizing the particle sampling or counting device; and wherein the growth medium is present within the particle sampling or counting device during sterilization thereof.

The robot controller may be further configured to direct movements of the robot to connect the particle sampling or counting device to the flow system. The particle sampling or counting device may further comprise a fluid inlet for receiving at least a portion of the fluid under flow; wherein the robot controller is further configured to direct movements of the robot to open the inlet to allow for fluid flow into the particle sampling or counting device. The particle sampling or counting device may further comprise a cover for enclosing the particle counting or sampling device; wherein the robot controller is further configured to direct movements of the robot to remove the cover to allow for fluid to contact the particle sampling or counting device.

The robot controller may be further configured to direct movements of the robot to close the inlet to stop fluid flow into the particle sampling or counting device. The robot controller may be further configured to direct movements of the robot to replace the cover to stop fluid from contacting the particle sampling or counting device.

The flow system may be integrated within a cleanroom or aseptic environment, and wherein the robot controller is further configured to direct movements of the robot to sample the particles from the fluid under flow in the absence of a user being physically present in the cleanroom or aseptic environment. The robot may be located inside of the cleanroom or aseptic environment and the robot controller is located outside of the cleanroom or aseptic environment. The provided system may further comprise a plurality of particle sampling or counting devices, wherein the robot controller is further configured to direct movements of the robot for stacking and unstacking the particle sampling or counting devices.

Without wishing to be bound by any particular theory, there may be discussion herein of beliefs or understandings of underlying principles relating to the devices and methods disclosed herein. It is recognized that regardless of the ultimate correctness of any mechanistic explanation or hypothesis, an embodiment of the invention can nonetheless be operative and useful.

DETAILED DESCRIPTION OF THE INVENTION

Figure 1:
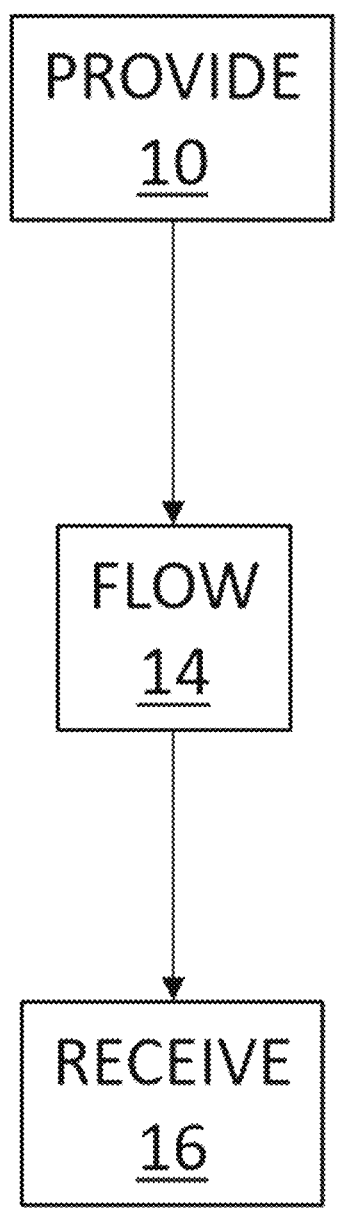
FIG. 1 is a flowchart of a method for sampling particles from a fluid in accordance with one embodiment of the disclosure.

In the following description, numerous specific details of the devices, device components and methods of the present invention are set forth in order to provide a thorough explanation of the precise nature of the invention. It will be apparent, however, to those of skill in the art that the invention can be practiced without these specific details.

In general, the terms and phrases used herein have their art-recognized meaning, which can be found by reference to standard texts, journal references and contexts known to those skilled in the art. The following definitions are provided to clarify their specific use in the context of the invention.

"Operably connected," "operatively coupled," "operatively connected," and "operatively coupled" refers to a configuration of elements, wherein an action or reaction of one element affects another element, but in a manner that preserves each element's functionality. The connection may be by a direct physical contact between elements. The connection may be indirect, with another element that indirectly connects the operably connected elements. The term also refers to two or more functionally-related components being coupled to one another for purposes of flow of electric current and/or flow of data signals. This coupling of the two or more components may be a wired connection and/or a wireless connection. The two or more components that are so coupled via the wired and/or wireless connection may be proximate one another (e.g., in the same room or in the same housing) or they may be separated by some distance in physical space (e.g., in a different building).

"Particles" refers to small objects which are often regarded as contaminants. A particle can be any material created by the act of friction, for example, when two surfaces come into mechanical contact and there is mechanical movement. Particles can be composed of aggregates of material, such as dust, dirt, smoke, ash, water, soot, metal, minerals, or any combination of these or other materials or contaminants. "Particles" may also refer to biological particles, for example, viruses, prions, spores and microorganisms including bacteria, fungi, archaea, protists, other single cell microorganisms and specifically those microorganisms having a size on the order of <1-15 µm. A particle may refer to any small object which absorbs, occludes or scatters light and is thus detectable by an optical particle counter. As used herein, "particle" is intended to be exclusive of the individual atoms or molecules of a carrier fluid, for example water molecules, process chemical molecules, oxygen molecules, helium atoms, nitrogen molecules, etc. Some embodiments of the present invention are capable of detecting, sizing, and/or counting particles comprising aggregates of material having a size greater than 10 nm, 20 nm, 30 nm, 50 nm, 100 nm, 500 nm, 1 µm or greater, or 10 µm or greater. Specific particles include particles having a size selected from 20 nm to 50 nm, 50 nm to 50 µm, a size selected from 100 nm to 10 µm, or a size selected from 500 nm to 5 µm.

The expression "sampling a particle" broadly refers to collection of particles in a fluid flow, for example, from an environment undergoing monitoring. Sampling in this context includes transfer of particles in a fluid flow to an impact surface, for example, the receiving surface of a growth medium. Alternatively, sampling may refer to passing particles in a fluid through a particle analysis region, for example, for optical detection and/or characterization. Sampling may refer to collection of particles having one or more preselected characteristics, such as size (e.g., cross sectional dimension such as diameter, effective diameter, etc.), particle type (biological or nonbiological, viable or nonviable, etc.) or particle composition. Sampling may optionally include analysis of collected particles, for example, via subsequent optical analysis, imaging analysis or visual analysis. Sampling may optionally include growth of viable biological particles, for sample, via an incubation process involving a growth medium. A sampler refers to a device for sampling particles.

"Impactor" refers to a device for sampling particles. In some embodiments, an impactor comprises a sample head including an inlet, e.g., one or more intake apertures, for sampling a fluid flow containing particles, whereby, in a sampling region of the impactor, at least a portion of the particles are directed onto an impact surface for collection, such as the receiving surface of a growth medium (e.g., culture medium such as agar, broth, etc.) or a substrate such as a filter. Impactors of some embodiments, provide a change of direction of the flow after passage through the intake apertures, wherein particles having preselected characteristics (e.g., size greater than a threshold value) do not make the change in direction and, thus, are received by the impact surface.

"Impinger" refers to an enclosed sampling device designed to contain a fluid to capture particles from an environmental fluid due to an interaction between the particles and the impinger fluid. The impinger may include an inlet, a sampling region where the particles interact with the fluid, and an outlet. For example, an impinger may contain a liquid allowing for particles in a vapor to become suspended within the liquid due to flow of the vapor over the surface or through the liquid media. Impingers may use water, condensates, polar fluids, non-polar fluids and solvents.

"Cyclone sampler" refers to a sampling device that directs the flow of a fluid though an inlet, into a vortex or cyclone within a sampling region of the sampler to force particles within the flow towards the outside of the sampler where they are captured, for example, due to the force of the fluid flow or within a sampling media or filtration system.

The expression "detecting a particle" broadly refers to sensing, identifying the presence of and/or characterizing a particle. In some embodiments, detecting a particle refers to counting particles. In some embodiments, detecting a particle refers to characterizing and/or measuring a physical characteristic of a particle, such as diameter, cross sectional dimension, shape, size, aerodynamic size, or any combination of these. A particle counter is a device for counting the number of particles in a fluid or volume of fluid, and optionally may also provide for characterization of the particles, for example, on the basis of size (e.g., cross sectional dimension such as diameter or effective diameter), particle type (e.g. biological or nonbiological), or particle composition. An optical particle counter is a device that detects particles by measuring scattering, emission, extinction or absorbance of light by particles.

"Flow direction" refers to an axis parallel to the direction the bulk of a fluid is moving when a fluid is flowing. For fluid flowing through a straight flow cell, the flow direction is parallel to the path the bulk of the fluid takes. For fluid flowing through a curved flow cell, the flow direction may be considered tangential to the path the bulk of the fluid takes.

"Optical communication" refers to an orientation of components such that the components are arranged in a manner that allows light or electromagnetic radiation to transfer between the components.

"Fluid communication" refers to the arrangement of two or more objects such that a fluid can be transported to, past, through or from one object to another. For example, in some embodiments two objects are in fluid communication with one another if a fluid flow path is provided directly between the two objects. In some embodiments, two objects are in fluid communication with one another if a fluid flow path is provided indirectly between the two objects, such as by including one or more other objects or flow paths between the two objects. For example, in one embodiment, the following components of a particle impactor are in fluid communication with one another: one or more intake apertures, an impact surface, a fluid outlet, a flow restriction, a pressure sensor, a flow-generating device. In one embodiment, two objects present in a body of fluid are not necessarily in fluid communication with one another unless fluid from the first object is drawn to, past and/or through the second object, such as along a flow path.

"Flow rate" refers to an amount of fluid flowing past a specified point or through a specified area, such as through intake apertures or a fluid outlet of a particle impactor. In one embodiment, a flow rate refers to a mass flow rate, i.e., a mass of the fluid flowing past a specified point or through a specified area. In one embodiment, a flow rate is a volumetric flow rate, i.e., a volume of the fluid flowing past a specified point or through a specified area.

"Pressure" refers to a measure of a force exhibited per unit area. In an embodiment, a pressure refers to a force exhibited by a gas or fluid per unit area. An "absolute pressure" refers to a measure of the pressure exerted by a gas or fluid per unit area as referenced against a perfect vacuum or volume exerting zero force per unit area. Absolute pressure is distinguished from a "differential pressure" or "gauge pressure", which refers to a relative change or difference in force exhibited per unit area in excess of or relative to a second pressure, such as an ambient pressure or atmospheric pressure.

"Polymer" refers to a macromolecule composed of repeating structural units connected by covalent chemical bonds or the polymerization product of one or more monomers, often characterized by a high molecular weight. The term polymer includes homopolymers, or polymers consisting essentially of a single repeating monomer subunit. The term polymer also includes copolymers, or polymers consisting essentially of two or more monomer subunits, such as random, block, alternating, segmented, grafted, tapered and other copolymers. Useful polymers include organic polymers or inorganic polymers that may be in amorphous, semi-amorphous, crystalline or partially crystalline states. Crosslinked polymers having linked monomer chains are particularly useful for some applications. Polymers useable in the methods, devices and components include, but are not limited to, plastics, elastomers, thermoplastic elastomers, elastoplastics, thermoplastics and acrylates. Exemplary polymers include, but are not limited to, acetal polymers, biodegradable polymers, cellulosic polymers, fluoropolymers, nylons, polyacrylonitrile polymers, polyamide-imide polymers, polyimides, polyarylates, polybenzimidazole, polybutylene, polycarbonate, polyesters, polyetherimide, polyethylene, polyethylene copolymers and modified polyethylenes, polyketones, poly(methyl methacrylate), polymethylpentene, polyphenylene oxides and polyphenylene sulfides, polyphthalamide, polypropylene, polyurethanes, styrenic resins, sulfone-based resins, vinyl-based resins, rubber (including natural rubber, styrenebutadiene, polybutadiene, neoprene, ethylene-propylene, butyl, nitrile, silicones), acrylic, nylon, polycarbonate, polyester, polyethylene, polypropylene, polystyrene, polyvinyl chloride, polyolefin or any combinations of these.

Figure 2:
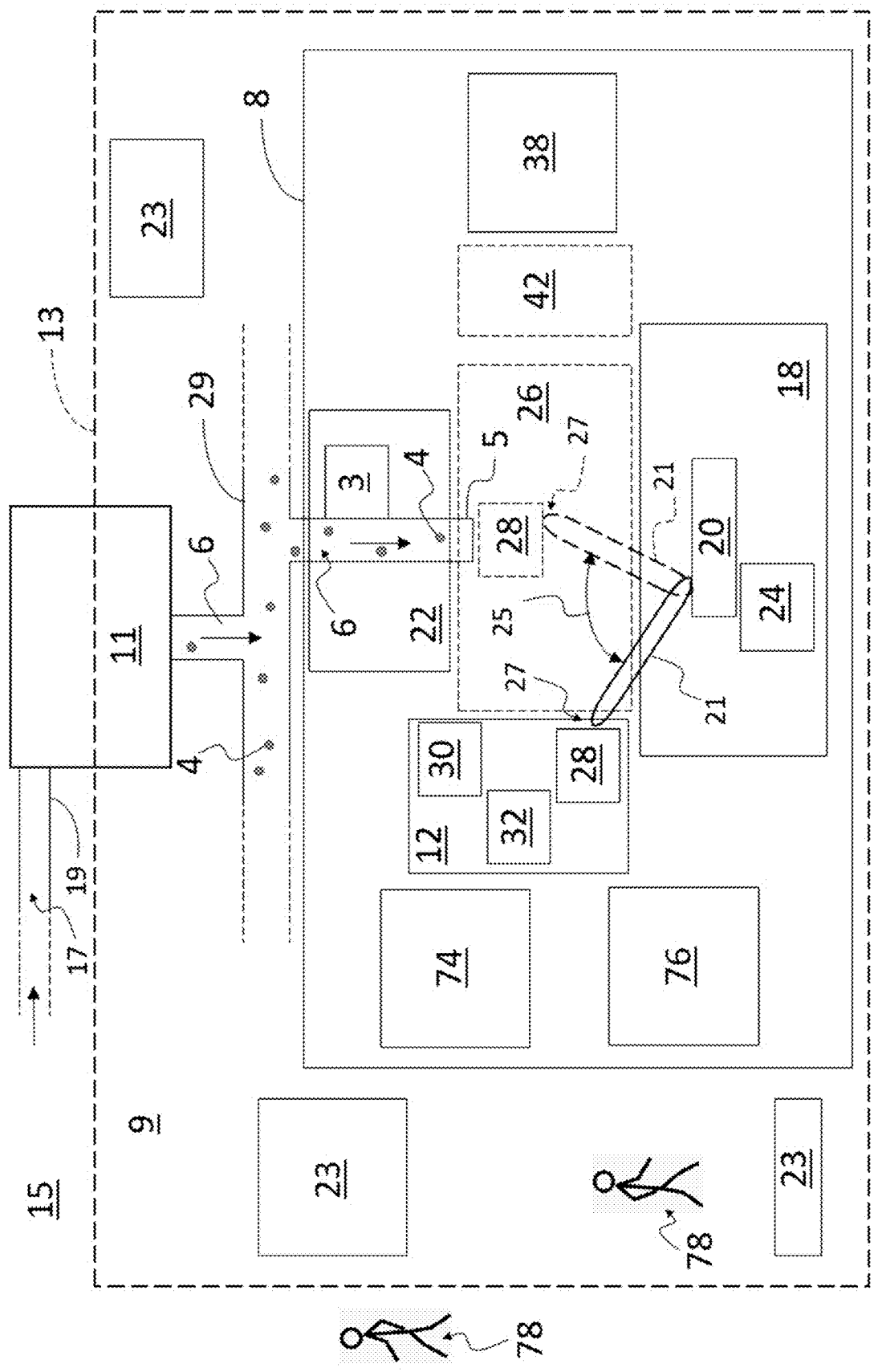
FIG. 2 is a schematic diagram of a system for sampling particles from a fluid which may be used to perform the method of FIG. 1 in accordance with one embodiment of the disclosure.

FIG. 1 is a flowchart of a method (2) for sampling particles (4) from a fluid (6) in accordance with one embodiment of the disclosure. FIG. 2 schematically shows an embodiment of an example robotic sampling and counting system (8) for sampling particles (4) from fluid (6). In an example, method (2) is implemented and performed, at least in part, by system (8).

Figure 15:
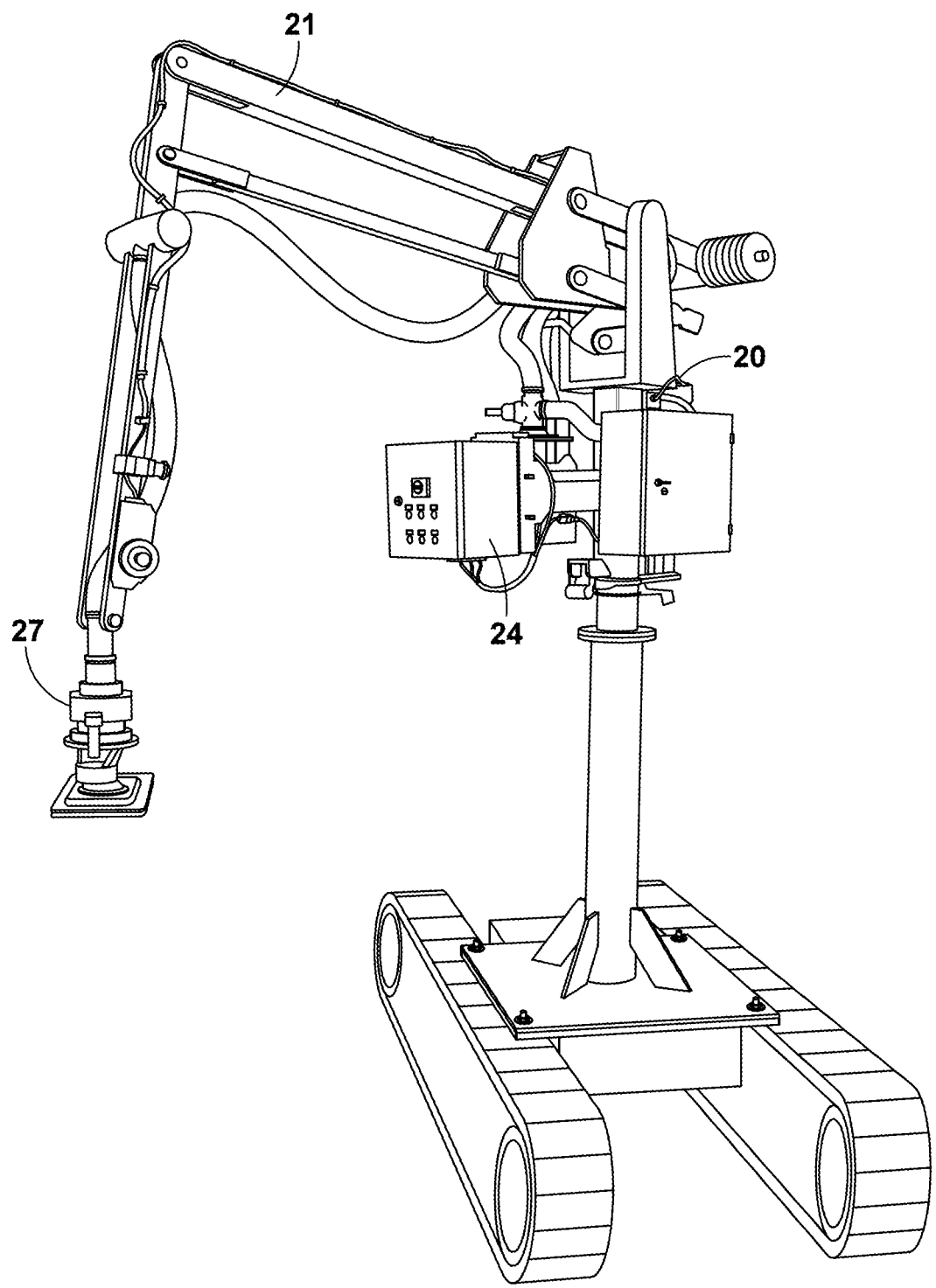
FIG. 15 provides an example of a robotic manipulator in accordance with one embodiment of the present invention.

Referring to FIGS. 1, 2, and 15, method (2) includes providing (10) a particle sampling or counting device (12). Method (2) includes flowing (14) at least a portion of fluid (6) through particle sampling or counting device (12), and receiving (16) at least a portion of particles (4) in fluid (6) in particle counting or sampling device (12). At least one of: providing step (10), flowing step (14), and receiving step (16), is performed by a system configured for robotic control (18) (e.g., a robotic manipulator (20)). Alternatively, any combination of: providing step (10), flowing step (14), and receiving step (16), are performed by system configured for robotic control (18). In another example, each of: providing step (10), flowing step (14), and receiving step (16), are performed by system configured for robotic control (18).

Referring to FIGS. 2 and 15, system (8) includes one or more particle sampling or counting device(s) (12). System (8) includes a flow system (22) for flowing at least a portion of fluid (6) into and/or through particle sampling or counting device (12) to facilitate receiving at least a portion of particles (4) in fluid (6) by the particle sampling or counting device (12). Flow system (22) includes a flow-regulating valve (3). Flow system (22) includes a sampling port (5) configured for flow communication with particle sampling or counting device (12). System (8) includes robotic manipulator (20) and a robot controller (24) for controlling robotic manipulator (20). Robot controller (24) is operatively connected to robotic manipulator (20). Robotic manipulator (20) includes at least one robot arm (21) having one or more degrees of freedom of movement. Robot arm (21) includes at least one working end (27) configured for at least one of: gripping, moving, and/or otherwise manipulating objects positioned inside system (8). Robot controller (24) is configured to direct movements (25) of robotic manipulator (20) for at least one of: positioning the particle sampling or counting device (12) in a sampling location (26), transporting particle sampling or counting device (12) to and from sampling location (26), and regulating a flow rate of the fluid (6) into and/or through the particle sampling or counting device (12).

In the example shown in FIGS. 2 and 15, system (8) is situated in an interior (9) of an aseptic or cleanroom environment (13). Aseptic or cleanroom environment (13) includes a heating, ventilation, and air conditioning (HVAC) system (11). HVAC system (11) may include components positioned in either interior (9) or an exterior (15), or both, of aseptic or cleanroom environment (13). HVAC system (11) receives a supply fluid (17) (e.g., air from exterior (15)) through at least one supply duct (19). HVAC system (11) processes supply fluid (17) to, for instance, regulate its temperature and/or flow rate, and/or reduce particulate matter present in supply fluid (17). Fluid (6) exits HVAC system

(11) and flows into interior (9) of cleanroom or aseptic environment (13) through at least one interior duct (29). Interior duct(s) (29) deliver fluid (6) to various processing equipment (23) positioned in cleanroom or aseptic environment (13).

Example 1—Particle and Biological Contaminant Sampling or Counting Devices, or Viable/Non-Viable Particle Sampling Devices In an example, particle sampling or counting device (12) is an impactor (28). Impactor (28) may be any of the devices disclosed in U.S. patent application Ser. No. 14/338,615, which is incorporated by reference herein in its entirety. In another example, particle sampling or counting device (12) is an impinger (30). In yet another example, particle sampling or counting device (12) is configured for use with cyclone-based methods. In still another embodiment, the particle sampling or counting device (12) is an optical particle counter (32). In still another embodiment, the particle sampling or counting device (12) includes any combination of: impactor (28), impinger (30), optical particle counter (32), and device (12) configured for use with cyclone-based methods. In yet another embodiment, the particle sampling or counting device (12) includes each of: impactor (28), impinger (30), optical particle counter (32), and device (12) configured for use with cyclone-based methods.

Figure 3:
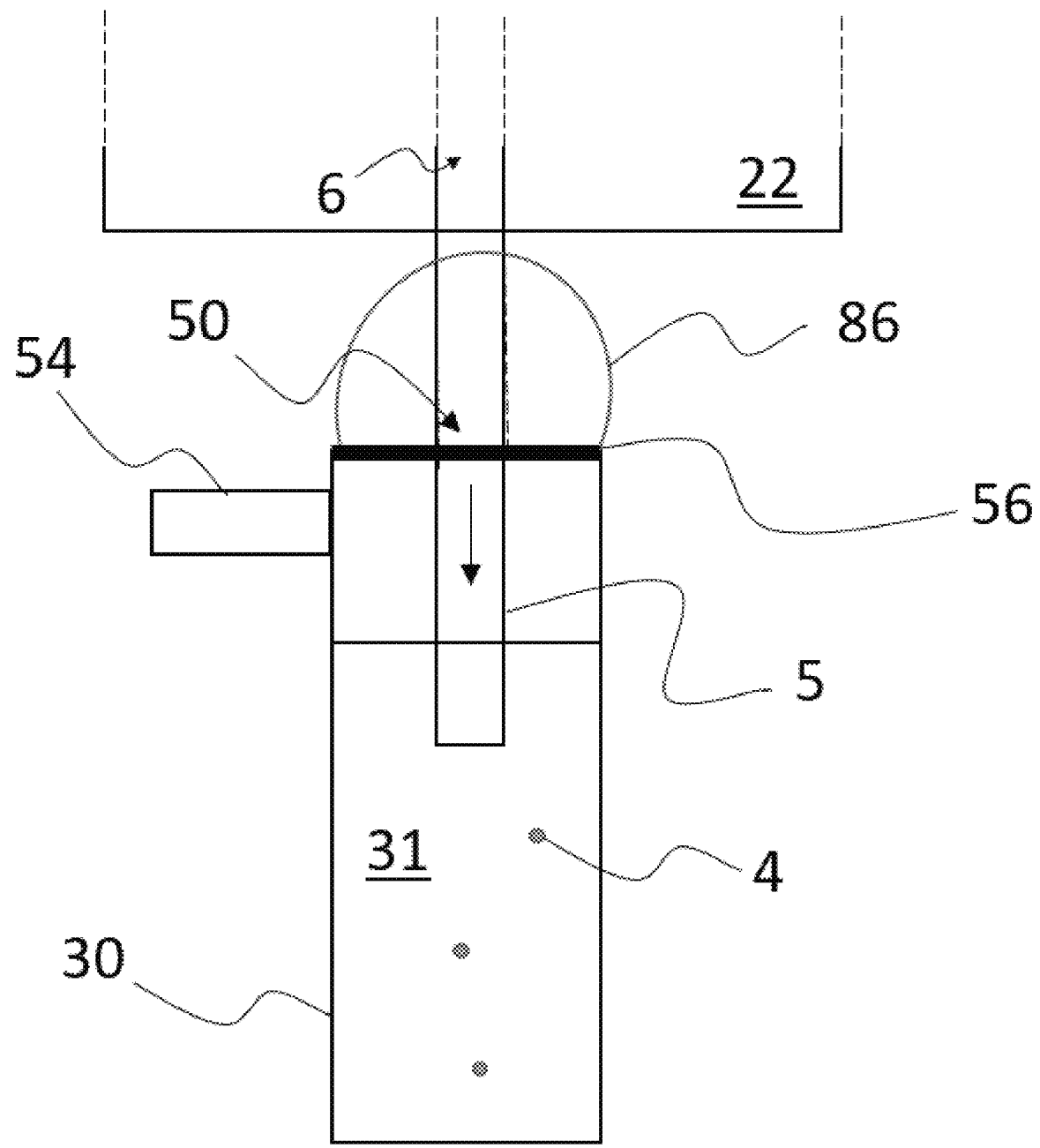
FIG. 3 is a schematic diagram of an exemplary impinger during use in the system of FIG. 2.

FIG. 3 is a schematic diagram of an exemplary impinger (30) during use in system (8). Impinger (30) is filled at least partially with a liquid (31), which may be a liquid growth medium (72). An end of impinger (30) is configured to be fitted (e.g., by robot arm (21) of robotic manipulator (20)) over an end of sampling port (5). Fluid (6) sampled by impinger (30) flows into impinger (30). Liquid (31) contained inside impinger (30) traps particles (4) present in fluid (6) for later characterization and/or analysis. After entrapment of particles (4) from incoming fluid (6) flowing into impinger (30) from sampling port (5), fluid (6) continues to flow out of impinger (30) from a fluid outlet (54). Impinger (30) includes a cover (86) and a seal (56) providing an airtight and/or hermetically sealed operative coupling of cover (86) to impinger (30) (e.g., to prevent contamination of liquid (31)).

Automated Sterilization

Figure 4:
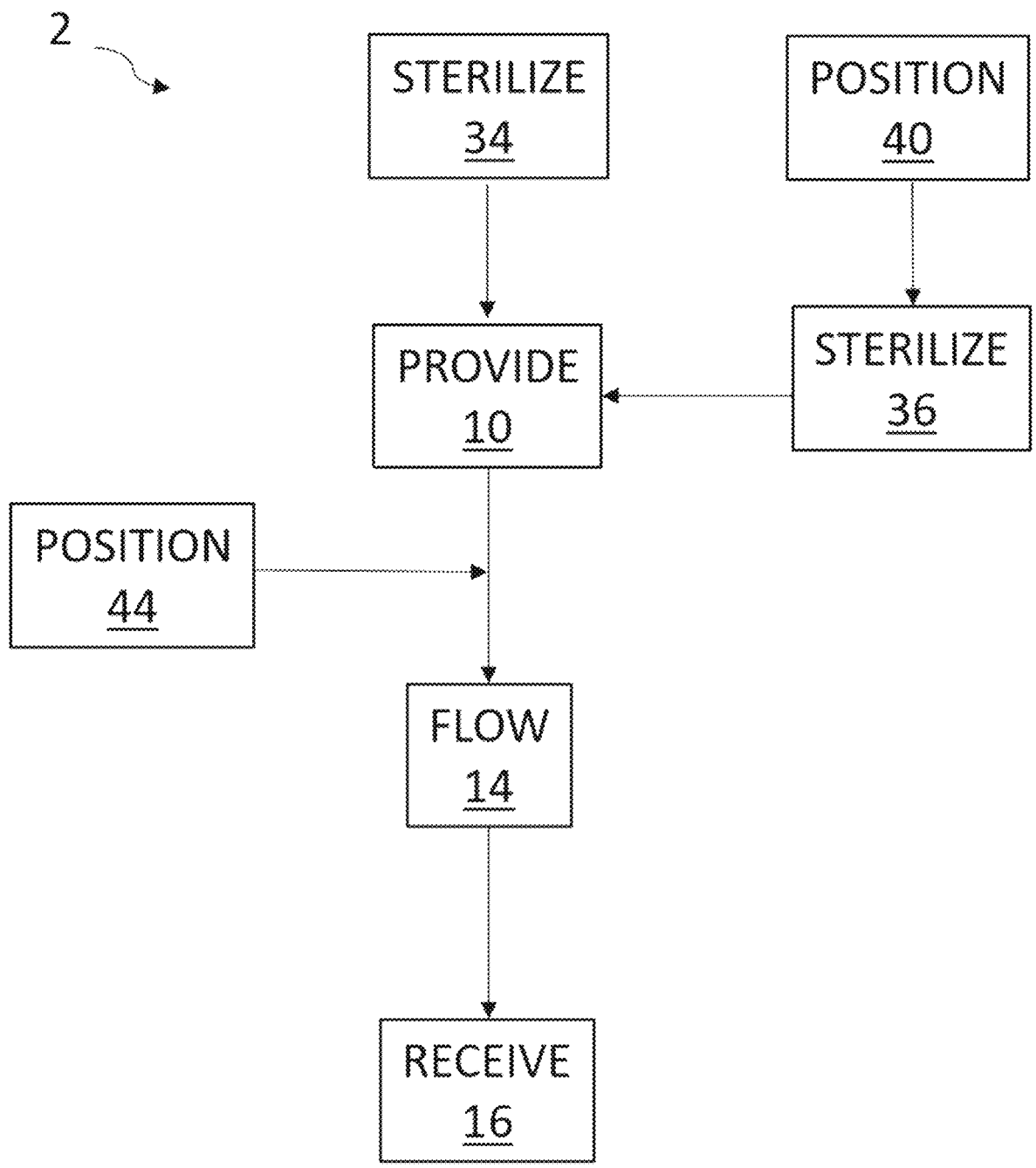
FIG. 4 is a flowchart of an example of the method shown in FIG. 1 in accordance with another embodiment of the disclosure.

FIG. 4 is a flowchart of an example of method (2) for sampling particles (4) from a fluid (6) in accordance with another embodiment of the disclosure. In the example, method (2) includes sterilizing (34) at least a portion of system configured for robotic control (18). In the example, method (2) includes sterilizing (36) particle sampling or counting device (12). In method (2), the sterilizing step (36) includes sterilizing particle sampling or counting device (12) in a fully assembled configuration.

Referring to FIG. 2, system (8) includes a sterilization system (38) for sterilizing the particle sampling or counting device (12). In an example, sterilization system (38) utilizes at least one of: vaporized hydrogen peroxide, chlorine dioxide, ethylene dioxide, radiation, moist heat, and dry heat. Robot controller (24) is configured to direct movements (25) of robotic manipulator (20) for transporting particle sampling or counting device (12) to sterilization system (38).

In the example, providing step (10) of method (2) includes positioning (40) particle sampling or counting device (12) to a location (42) for the sterilizing step (34 and/or 36) by system configured for robotic control (18) (e.g., including, without limitation, robotic manipulator (20)). In the example, positioning (40) is performed in method (2) prior to the step of providing (10). Alternatively, positioning (40) is performed in method (2) after the step of providing (10). In another example, positioning (40) is performed in method (2) concurrently with the step of providing (10). In the example, positioning (40) is performed in method (2) prior to sterilizing (34 and/or 36). Alternatively, positioning (40) is performed in method (2) concurrently with sterilizing (34 and/or 36). In an example, providing step (10) of method (2) includes positioning (44) particle sampling or counting device (12) for receiving (16) the particles (4) from the sterilizing step (34 and/or 36) by system configured for robotic control (18).

Particle Collection Configuration

Figure 5:
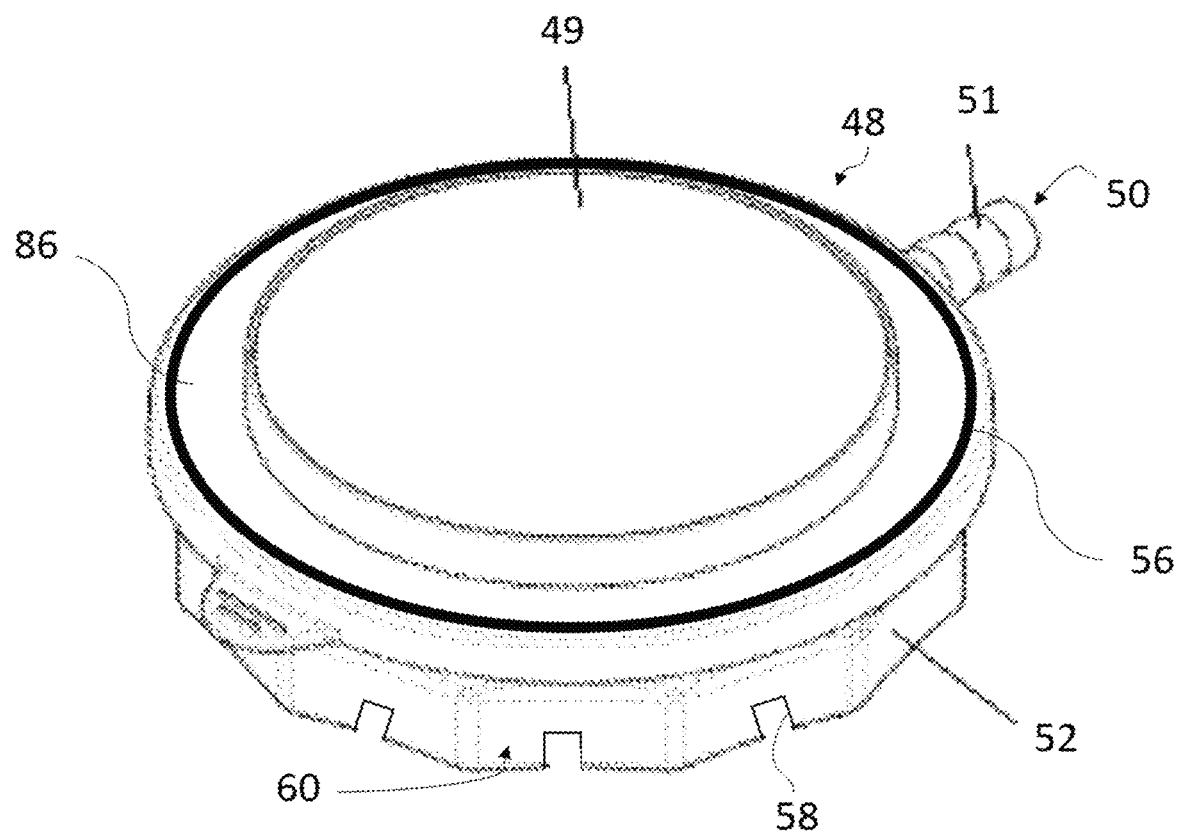
FIG. 5 shows a perspective view of an exemplary impactor of the present invention.
Figure 6:
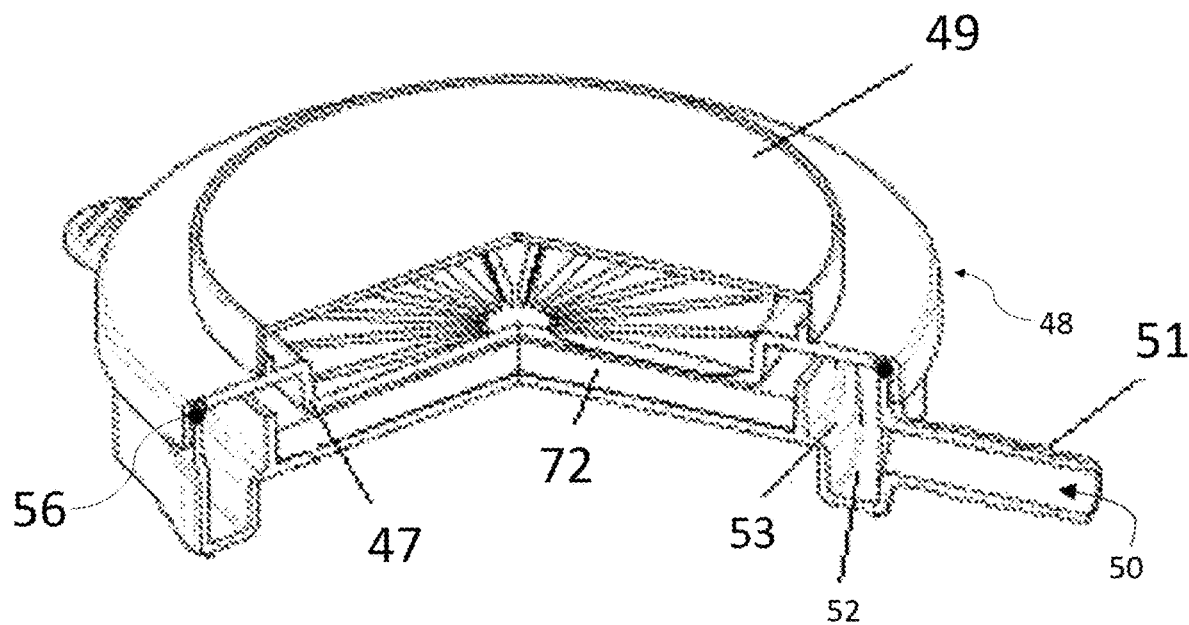
FIG. 6 shows a sectional view of impactor of FIG. 2.
Figure 7:
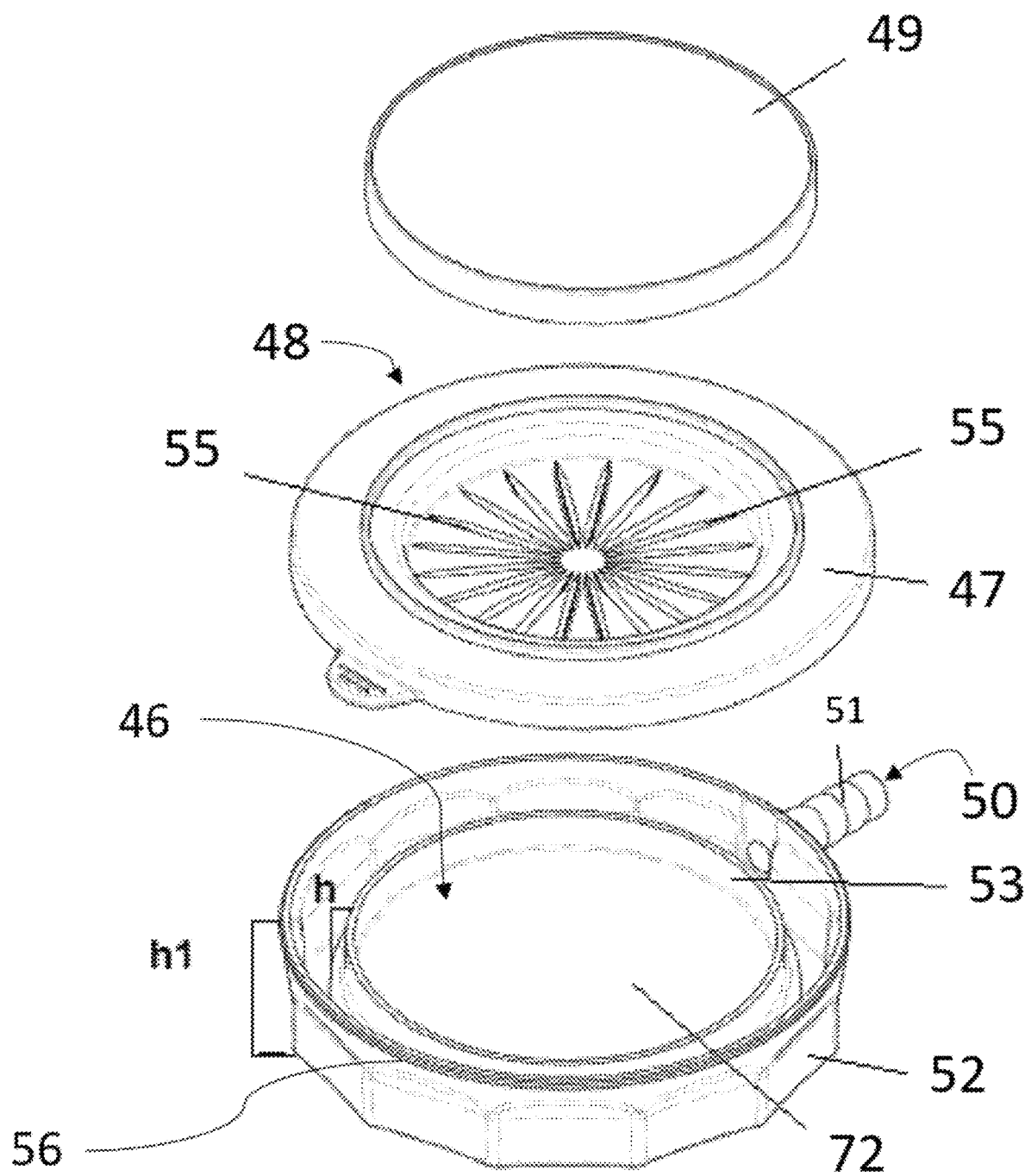
FIG. 7 is an exploded view of the impactor of FIGS. 5 and 6, wherein components of the device are spatially separated for clarity.
Figure 8:
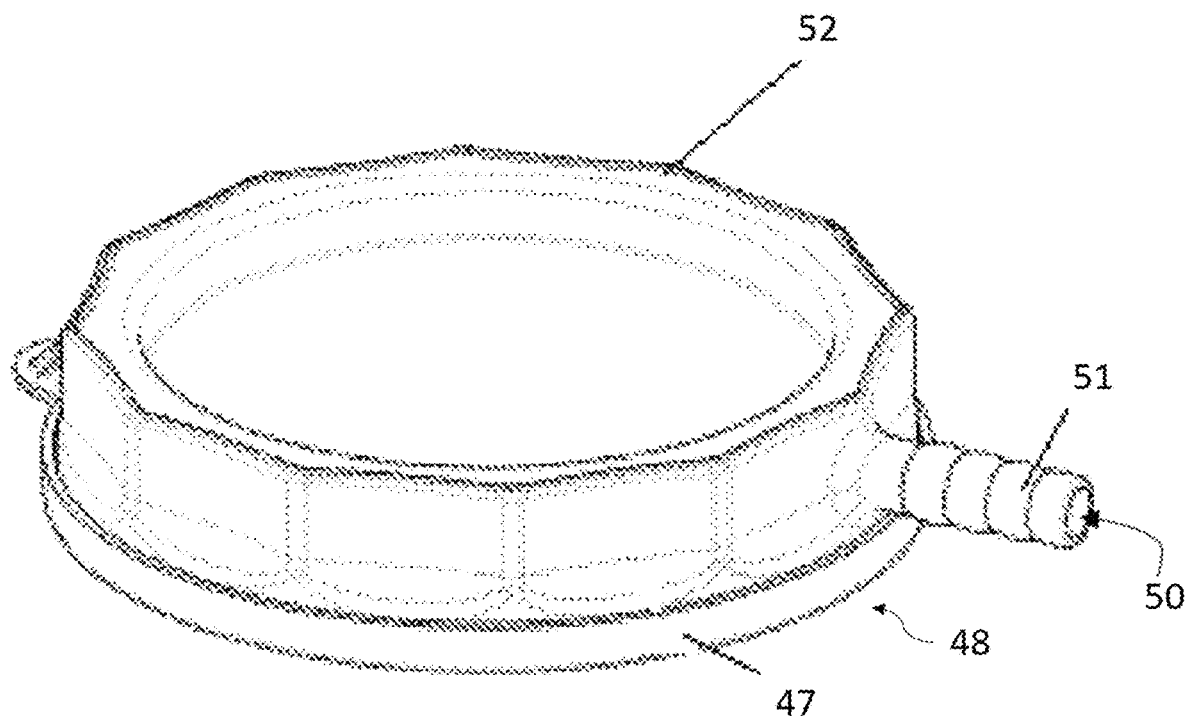
FIG. 8 shows a perspective view of impactor of the present invention.
Figure 9:
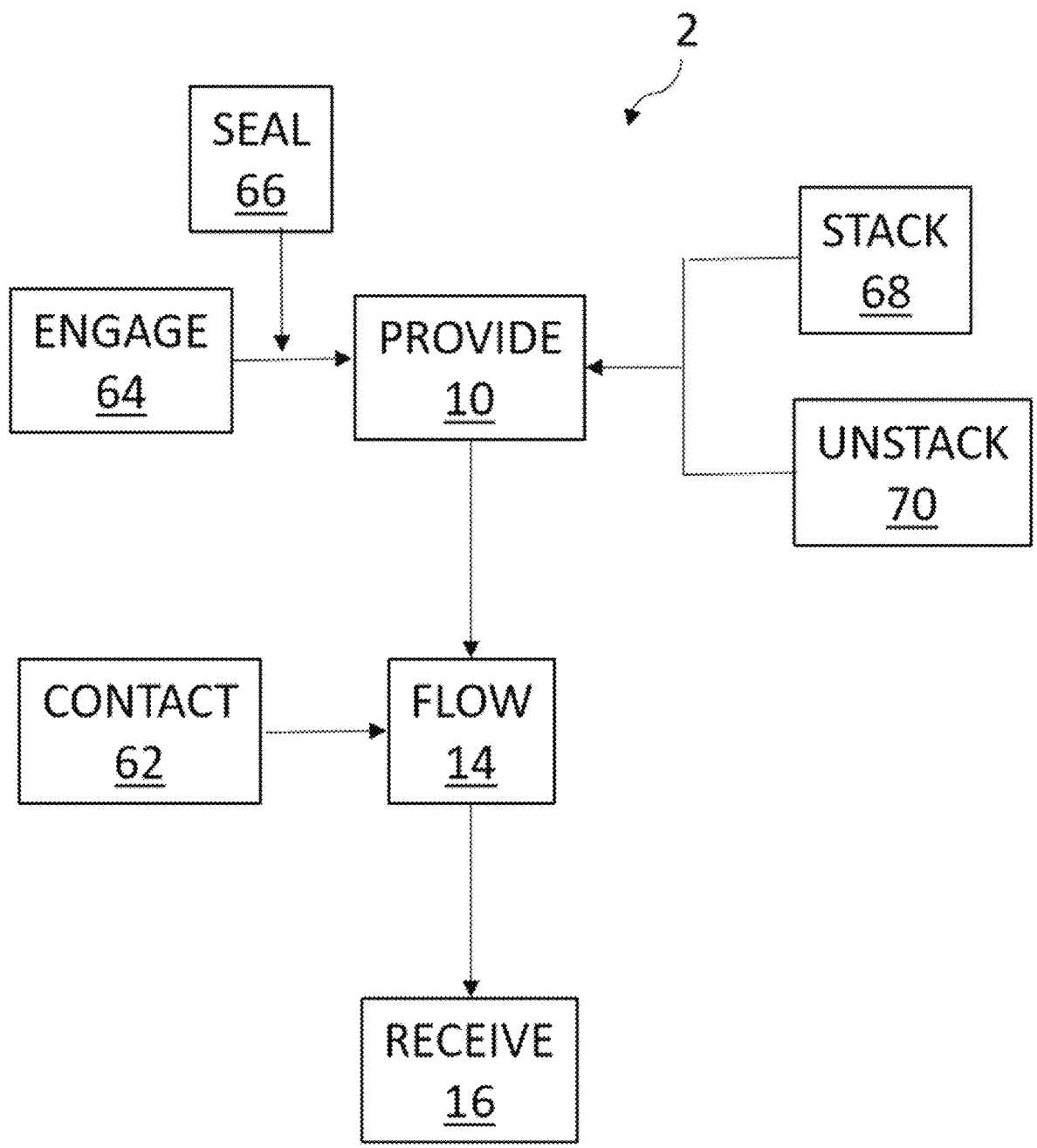
FIG. 9 is a flowchart of an example of the method shown in FIG. 1 in accordance with yet another embodiment of the disclosure.
Figure 10:
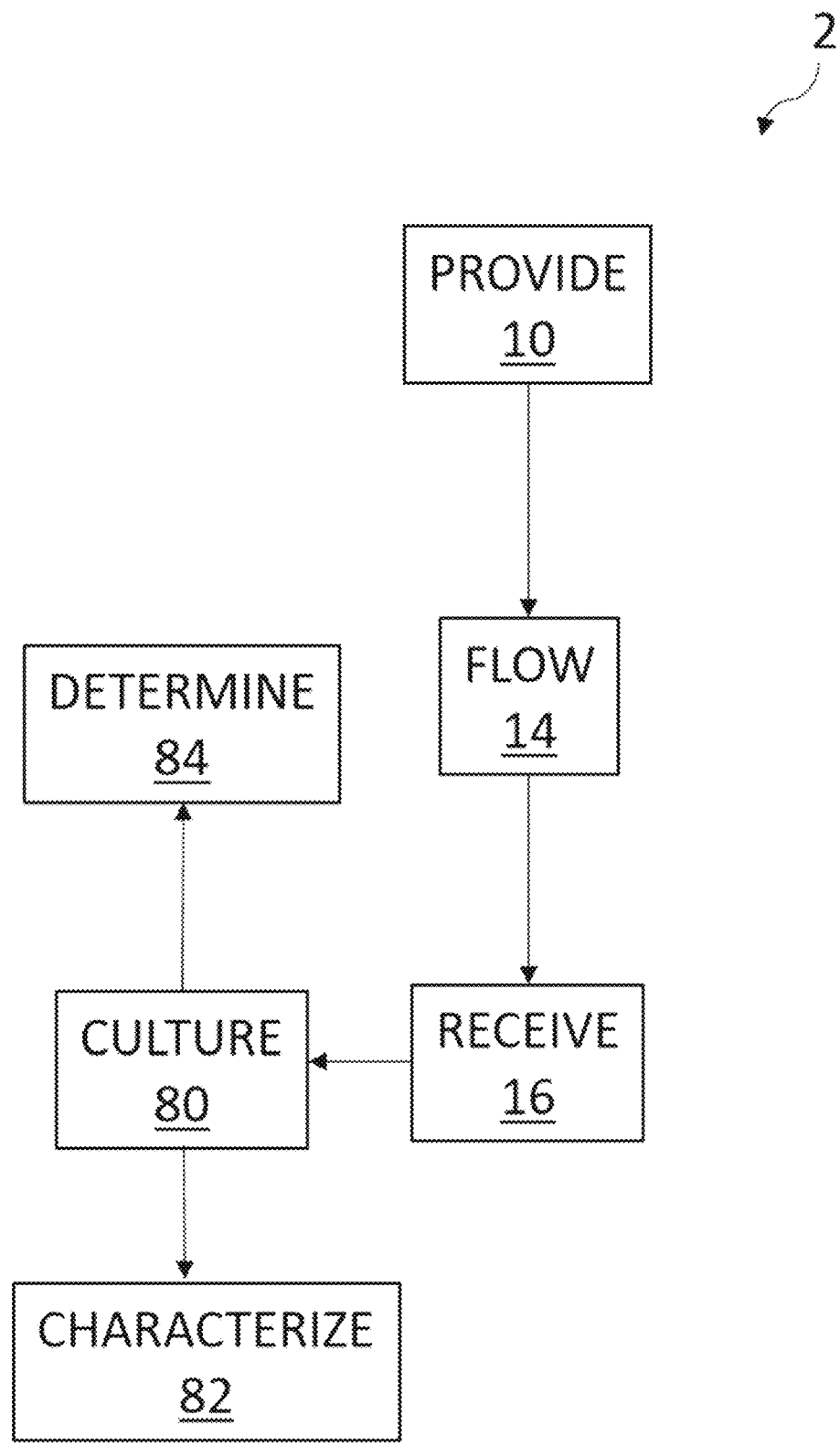
FIG. 10 is a flowchart of an example of the method shown in FIG. 1 in accordance with still another embodiment of the disclosure.
Figure 11:
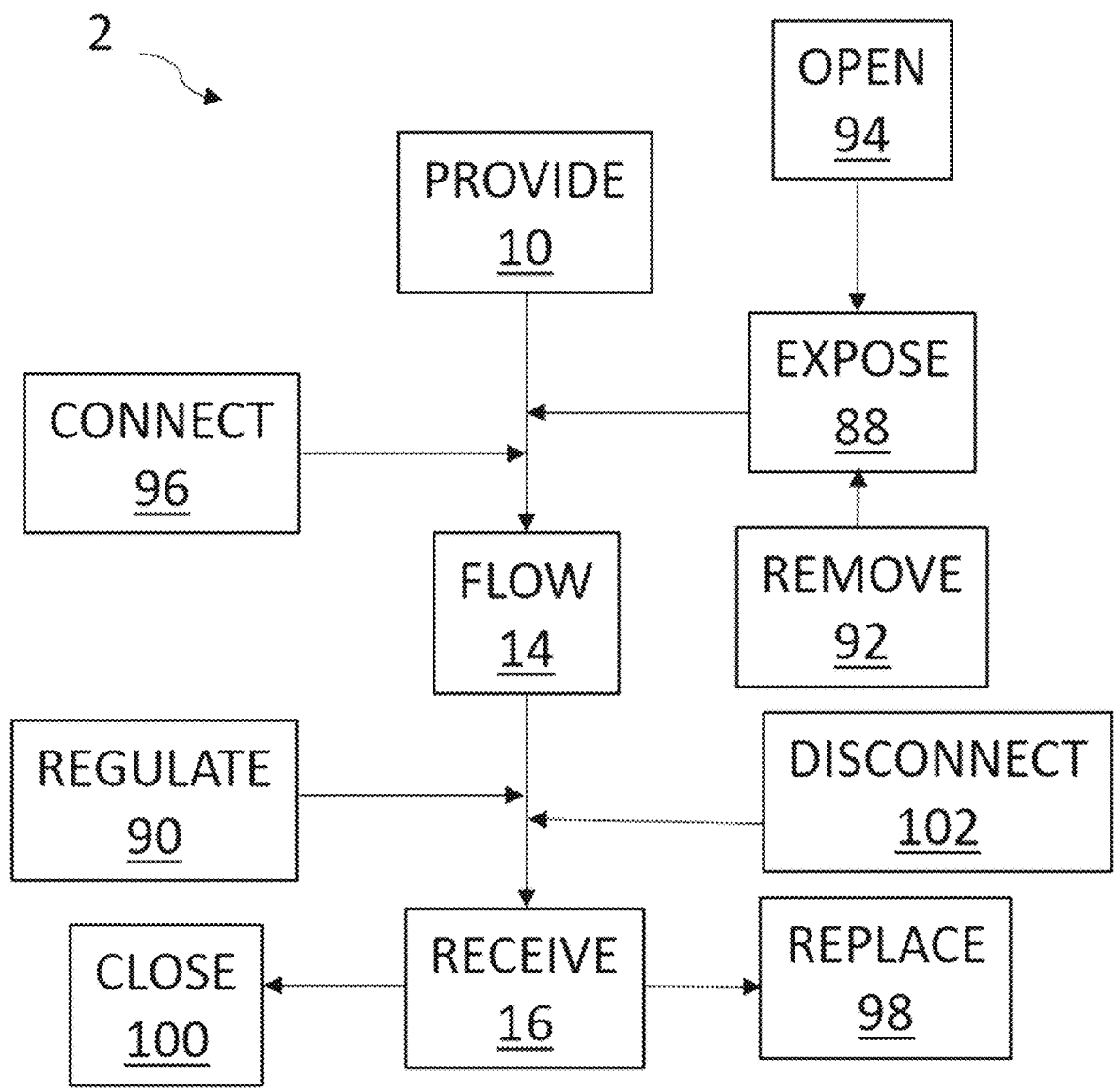
FIG. 11 is a flowchart of an example of the method shown in FIG. 1 in accordance with another embodiment of the disclosure.
Figure 12:
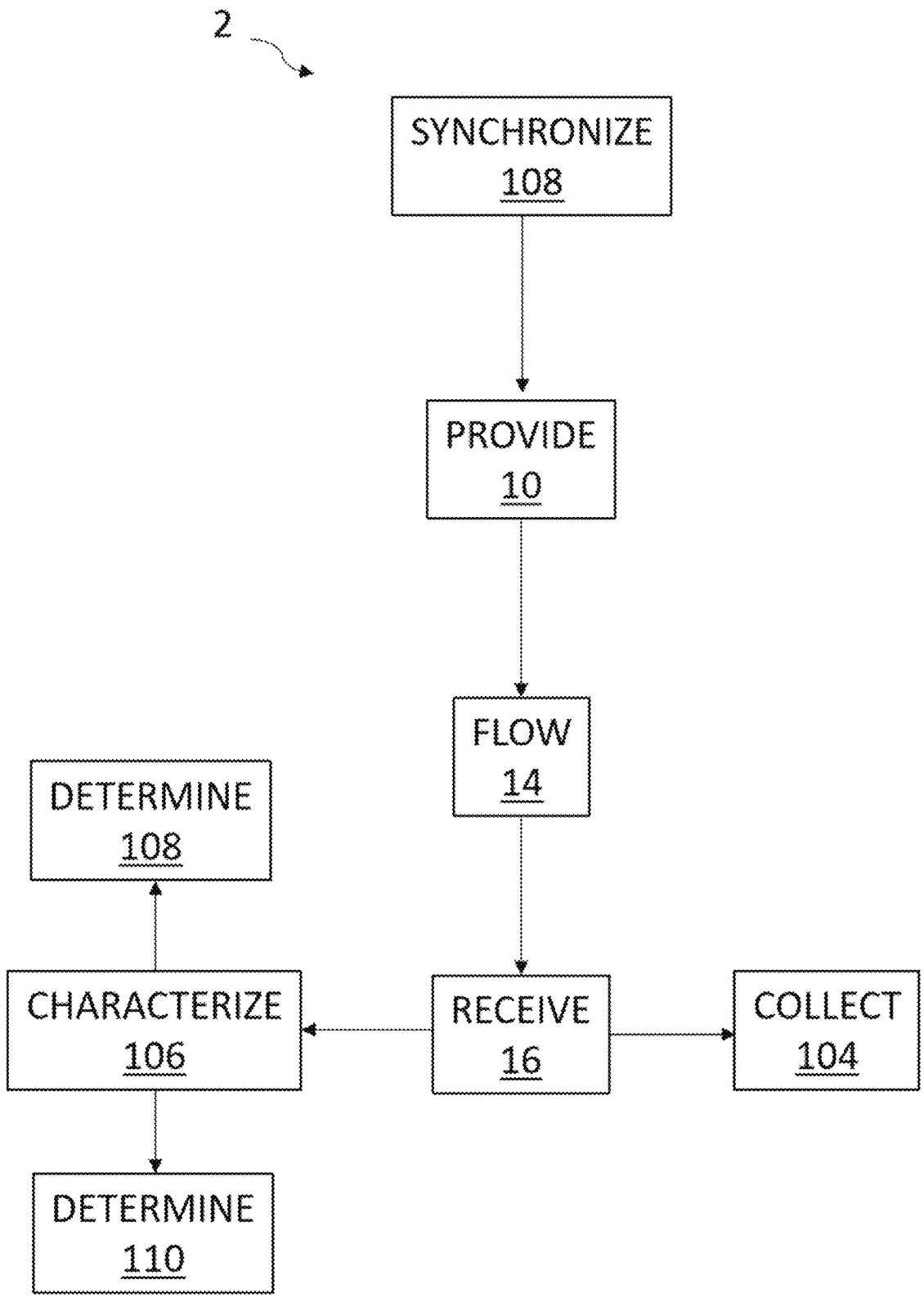
FIG. 12 is a flowchart of an example of the method shown in FIG. 1 in accordance with yet another embodiment of the disclosure.

In an example, particle sampling or counting device (12) of system (8) is impactor (28). FIG. 5 shows a perspective view of an exemplary impactor (28) of the present invention. FIG. 6 shows a sectional view of impactor (28) of FIG. 2. FIG. 7 is an exploded view of the impactor (28) of FIGS. 5 and 6, wherein components of the device are spatially separated for clarity. FIG. 8 shows a perspective view of impactor (28) of the present invention.

In the embodiment of particle counting or sampling device (12) illustrated in FIGS. 5-8, impactor (28) includes a base (52) portion, a dispensing portion (47) and a protective portion (49). Furthermore, impactor (28) as a whole is disposable or usable for a single sampling of the air to be sampled and/or analyzed. In particular, base (52) comprises a support (53) suitable for accommodating a growth (e.g., culture) medium (72) for the growth of microorganisms. Preferably, said support (53) may be a Petri dish. In a preferred embodiment of the present invention, the support (53) has a height h and an area A smaller than the height h1 and the area A1 of the base (52).

Purely by way of example and not limitation, the height h of support (53) has a value of between 17 mm and 19 mm, and the area A of said support (53) has a value of between 5,930 mm2 and 5,940 mm2. Furthermore, the height h1 of the base (52) may have a value of between 22 mm and 24 mm, and the area A1 of base (52) may have a value of between 10,730 mm2 and 10,760 mm2.

As indicated above, support (53) is adapted to receive growth medium (72) suitable for growth of microorganisms, for example, when impactor (28) is placed in conditions of temperature and O2/CO2 favorable to the growth of colony-forming units (CFU). Depending on the type of microorganism whose presence in the air of the environment is to be analyzed, the technician using basic knowledge will be able to identify, among the known growth media, the one most suitable to his/her needs. Purely by way of example and not limitation, growth medium (72) can be chosen from TSA (Tryptone Soy Agar) or SDA (Sabouraud Dextrose Agar). For the purposes of the present invention, the amount of growth medium (72) present in the support (53) is such as to ensure the growth of microbial colonies on medium (72). In this perspective, the support (53) is preferably adapted to receive a volume of 20-40 mL of medium. Base (52) includes, as evident from FIGS. 5-8, a conduit (51) for fluid (6), adapted to connect an interior region of base (52) with the outside, e.g., via sampling port (5). Preferably, conduit (51) is closed, for example by means of a cap placed on its free end, when impactor (28) is not performing sampling of fluid (6), such as during transport of impactor (28) or during its storage. Conversely, when impactor (28) is performing fluid (6) sampling, conduit (51) is adapted to be connected to a vacuum source (not shown) in such a way as to facilitate the deposition of microorganisms present in the fluid (6) (e.g., air) sample on growth medium (72).

Dispensing portion (47) of impactor (28) comprises one or more openings (55) to ensure the passage of airborne microorganisms onto growth medium (72). To this end, as shown in FIGS. 6 and 7, one or more openings (55) are positioned adjacent to the growth medium (72) when the dispensing portion (47) is connected to base (52). Openings (55) may have any type of shape deemed suitable to a person skilled in the art for the purposes of the present invention. Preferably, openings (55) are rectangular in shape and distributed over the entire area (A) of support (53). In one embodiment, openings (55) are distributed in a substantially uniform manner over the entire area A of the support (53). As shown by way of example in FIGS. 5-8, this uniform distribution can be, for example, a radial pattern. A uniform arrangement of openings (55) onto growth medium (72) is particularly advantageous since it allows the identification of the presence of possible false positives during the evaluation phase of the air sample contamination, e.g., where a microorganism is not uniformly distributed and detected across growth medium (72).

As indicated above, impactor (28) operates in a similar manner to impactors for microbial air sampling. Therefore, it is shaped in such a way as to define a connection path of fluid (6) (e.g., air) between the one or more openings (55) and conduit (51). In order to ensure that the passage of microorganisms preferably takes place only through openings (55), dispensing portion (47) and base (52) portion may be connected to each other to seal, for example, without limitation, by means of an interlocking mechanism.

Impactor (28) also includes a protective portion (49) that may be positioned on dispensing portion (47) so as to occlude one or more openings (55), for example when impactor (28) is not performing fluid (6) sampling. In one embodiment of the present invention, protective portion (49), base (52) portion and/or dispensing portion (47) can be made of transparent material. Preferably, the transparent material can be plastic and/or glass. In the embodiment of impactor (28) in which dispensing portion (47), protective portion (49) and/or base (52) are made of transparent material is particularly advantageous. In fact, once impactor (28) is placed in temperature, O2 or CO2 conditions suitable to the growth of microorganisms, the count and/or other characterization(s) and/or analysis of the colony-forming units (CFU) may be conducted without the need to remove dispensing portion (47), protective portion (49) and/or base (52) in order to access and inspect growth medium (72). Counting of colony-forming units present in growth medium (72) provides a quantitative estimate of the contamination of the fluid (6) sample and then of, for instance, the air of the environment of interest (e.g., environment (13)). With respect to the mode of operation of impactor (28), it operates by favoring the deposition of microorganisms present in the fluid (6) sampled by impact of the fluid (6) passing into the openings (55) of growth medium (72).

Impactor (28) includes a collection surface (46) configured to receive at least a portion of particles (4) in fluid (6). In the example, particle sampling or counting device (12) (e.g., impactor (28)) includes a sampling head (48) having one or more inlets (48) for receiving at least a portion of fluid (6) under flow. In the example, particle sampling or counting device (12) (e.g., impactor (28)) includes a base (52) operationally connected to sampling head (48) to receive at least a portion of sampled fluid (6) from sampling head (48). Base (52) includes collection surface (46), and a fluid outlet (54). In the example, sampling head (48) and base (52) are integrated components that engage to enclose collection surface (46). In the example, flow system (22) is configured to contact at least a portion of fluid (6) under flow with the collection surface (46) (via sampling port (5)).

In an example, sampling head (48) and base (52) engage to entirely enclose collection surface (46). Sampling head (48) and base (52) may engage via a substantially airtight seal (56). Sampling head (48) and base (52) may each independently be formed of a polymer material. At least a portion of base (52), sampling head (48), or both may be optically transparent. Base (52) may have a plurality of grooves (58) provided on an outer surface (60) of base (52) to allow for effective handling of particle sampling or counting device (12) (e.g., impactor (28)) by robotic manipulator (20). Base (52) may have one or more features to allow for effective stacking and/or unstacking of a plurality of particle sampling or counting devices (12) (e.g., a plurality of impactors (28)), including, for example and without limitation, by robotic manipulator (20). Any of the particle sampling or counting devices (12) describe herein may be a single use particle counting or sampling device (12).

FIG. 9 is a flowchart of an example of method (2) for sampling particles (4) from a fluid (6) in accordance with yet another embodiment of the disclosure. In the example, flowing step (14) of method (2) includes contacting (62) at least a portion of the fluid (6) with the collection surface (46). Providing step (10) of method (2) includes engaging (64) sampling head (48) and base (52) to entirely enclose collection surface (46) of particle sampling or counting device (12) (e.g., impactor (28)). Engaging step (64) may include sealing (66) sampling head (48) and base (52) engage via substantially airtight seal (56). Providing step (10) of method (2) may include stacking (68) and/or unstacking (70) particle sampling or counting devices (12). Referring again to FIG. 4, in method (2), for the step of sterilizing (36) particle sampling or counting device (12) in method (2), the collection surface (46) remains enclosed during sterilization.

Systems for Detection and Characterization of Biological Particles

In an example, in system (8), collection surface (46) of particle sampling or counting device (12) (e.g., impactor (28)) of system (8) includes a growth medium (72) for receiving biological particles (4) in the fluid (6) under flow. In the example, system configured for robotic control (18) (e.g., robotic manipulator (20)) includes an optical detector (74) for detecting biological particles (4) in or on growth medium (72). In another example, system configured for robotic control (18) includes an imaging device (76) for detecting biological particles (4) in or on growth medium (72). In yet another example, system configured for robotic control (18) includes optical detector (74) and imaging device (76) for detecting biological particles (4) in or on growth medium (72).

In the example, robot controller (24) is configured to direct movements (25) of the robotic manipulator (20) for exposing particle sampling or counting device (12) (e.g., impactor (28)) and/or collection surface (46) to fluid (6). Robot controller (24) is configured to direct movements (25) of robotic manipulator (20) to collect particles (4) from particle sampling or counting device (12) (e.g., impactor (28)) and/or collection surface (46). Robot controller (24) is further configured to direct movements (25) of robotic manipulator (20) to sample particles (4) from fluid (6) in the absence of a user (78) physically contacting particle sampling or counting device (12) (e.g., impactor (28)).

In the example, particle sampling or counting device (12) (e.g., impactor (28)) and/or collection surface (46) includes growth medium (72) for receiving biological particles (4) in fluid (6). Robot controller (24) is configured to direct movements (25) of the robotic manipulator (20) for transporting particle sampling or counting device (12) (e.g., impactor (28)) to sterilization system (38) in a fully assembled configuration for sterilizing particle sampling or counting device (12). Growth medium (72) is present within particle sampling or counting device (12) during sterilization thereof.

FIG. 10 is a flowchart of an example of method (2) for sampling particles (4) from a fluid (6) in accordance with still another embodiment of the disclosure. In the example, method (2) includes culturing (80) at least a portion of biological particles (4) received by growth medium (72). The culturing step (80) enables and allows for optical detection of grown biological particles (4) (e.g., by optical detector (74) and/or imaging device (76)). In the example, culturing step (80) may be carried out without disassembling the fully assembled particle sampling or counting device (12).

In the example, method (2) includes characterizing (82) at least a portion of the grown biological particles (4) by at least one of: visualization (e.g., by user (78)), optical detection (e.g., by optical detector (74)), imaging (e.g., by imaging device (76)), and polymerization chain reaction (PCR). In the example, the steps of culturing (80), characterizing (82), or both may be carried out by the system configured for robotic control (18) (e.g., robotic manipulator (20)). In the example, method (2) includes determining (84) at least one of: a presence of, a viability of, and an identity of microorganisms in the grown biological particles (4). In the example, the determining (84) step may be carried out by the system configured for robotic control (18).

Referring to FIG. 4, the sterilizing step (36) of method (2) includes sterilizing (36) particle sampling or counting device (12) (e.g., impactor (28)) in a fully assembled configuration and with collection surface (46) remaining enclosed by sampling head (48) and base (52) during sterilization. In this example, the sterilizing step (36) may be performed by treating the fully assembled and enclosed particle sampling or counting device (12) with at least one of: vaporized hydrogen peroxide, chlorine dioxide, ethylene dioxide, moist heat, dry heat, and radiation.

Robotic Control and Positioning

In an example, robot controller (24) of system (8) is configured to direct movements (25) of the robotic manipulator (20) to connect the particle sampling or counting device (12) to the flow system (22) (e.g., via sampling port (5)). In the example, particle sampling or counting device (12) (e.g., impactor (28)) includes inlet (50) for receiving at least a portion of fluid (6) under flow. Robot controller (24) is configured to direct movements (25) of robotic manipulator (20) to open inlet (50) to allow for fluid (6) flow into particle sampling or counting device (12).

In the example, particle sampling or counting device (12) includes a cover (86) for enclosing particle counting or sampling device (12). Robot controller (24) is configured to direct movements (25) of robotic manipulator (20) to remove cover (86) to allow for fluid (6) to contact particle sampling or counting device (12). In the example, robot controller (24) is configured to direct movements (25) of robotic manipulator (20) to close inlet (50) to stop fluid (6) flow into particle sampling or counting device (12). Robot controller (24) is configured to direct movements (25) of robotic manipulator (20) to replace cover (86) to stop fluid (6) from contacting particle sampling or counting device (12).

FIG. 11 is a flowchart of an example of method (2) for sampling particles (4) from a fluid (6) in accordance with yet another embodiment of the disclosure. In the example, the providing step (10) of method (2) includes exposing (88) particle sampling or counting device (12) to fluid (6) using system configured for robotic control (18) (e.g., robotic manipulator (20)). In the example, the flowing step (14) includes regulating (90) (e.g., via regulating-valve (3)) a flow rate of fluid (6) (e.g., into device (12) via inlet (50)) by system configured for robotic control (18) (e.g., robotic manipulator (20)).

In the example, method (2) includes removing (92) cover (86) of particle sampling or counting device (12) by system configured for robotic control (18) (e.g., robotic manipulator (20)). Method (2) includes opening (94) inlet (50) of particle counting or sampling device (12) by system configured for robotic control (18) (e.g., robotic manipulator (20)). Method (2) includes connecting (96) particle sampling or counting device (12) to flow system (22) to allow for flowing fluid (6) by the system configured for robotic control (18) (e.g., robotic manipulator (20)).

In the example, method (2) includes replacing (98) cover (86) of particle sampling or counting device (12) by system configured for robotic control (18) (e.g., robotic manipulator (20)). Method (2) includes closing (100) inlet (50) of particle counting or sampling device (12) by system configured for robotic control (18). Method (2) includes disconnecting (102) particle sampling or counting device (12) from flow system (22) to stop flow of fluid (6) by system configured for robotic control (18) (e.g., robotic manipulator (20)).

Particle Collection and Characterization

FIG. 12 is a flowchart of an example of method (2) for sampling particles (4) from a fluid (6) in accordance with still another embodiment of the disclosure. In the example, method (2) includes collecting (104) at least a portion of particles (4) received by particle sampling or counting device (12) and/or the collection surface (46). In the example, collecting step (104) is performed by system configured for robotic control (18) (e.g., robotic manipulator (20)). In this example, system configured for robotic control (18) includes imaging device (76).

In the example, method (2) includes a characterizing step (106) particles (4) performed by imaging device (76). The step of characterizing (106) may include determining (108) a chemical composition of particles (4). The step of characterizing (106) may include determining (110) a particle size distribution of particles (4).

In an example, method (2) includes a synchronizing step (107). For example, based on a user (78)-predetermined schedule, system (8) performs synchronized sampling of fluid (6) by robotic manipulator (20) for particles (4) based on the specific cycle (mode) that is being performed in environment (13) (e.g., filling vials, capping vials, among others, in a pharmaceutical manufacturing facility). Any of the steps in any of the embodiments of method (2) disclosed herein may be synchronized in like manner.

Absence of User Interaction

In an example, flow system (22) of system (8) is integrated within a cleanroom or aseptic environment (13). In the example, robot controller (24) is configured to direct movements (25) of robotic manipulator (20) to sample particles (4) from fluid (6) under flow in the absence of a user (78) being physically present in cleanroom or aseptic environment (13). In the example, robotic manipulator (20)

is located inside of the cleanroom or aseptic environment (13) and the robot controller (24) is located outside of the cleanroom or aseptic environment (13). Alternatively, robotic manipulator (20) and robot controller (24) are both located inside cleanroom or aseptic environment (13). In the example, fluid (6) originates in cleanroom or aseptic environment (13). Fluid (6) terminates in cleanroom or aseptic environment (13). Alternatively, fluid (6) originates in cleanroom or aseptic environment (13) and fluid (6) terminates outside cleanroom or aseptic environment (13). In another example, fluid (6) originates outside cleanroom or aseptic environment (13) and fluid (6) terminates inside cleanroom or aseptic environment (13).

Figure 13:
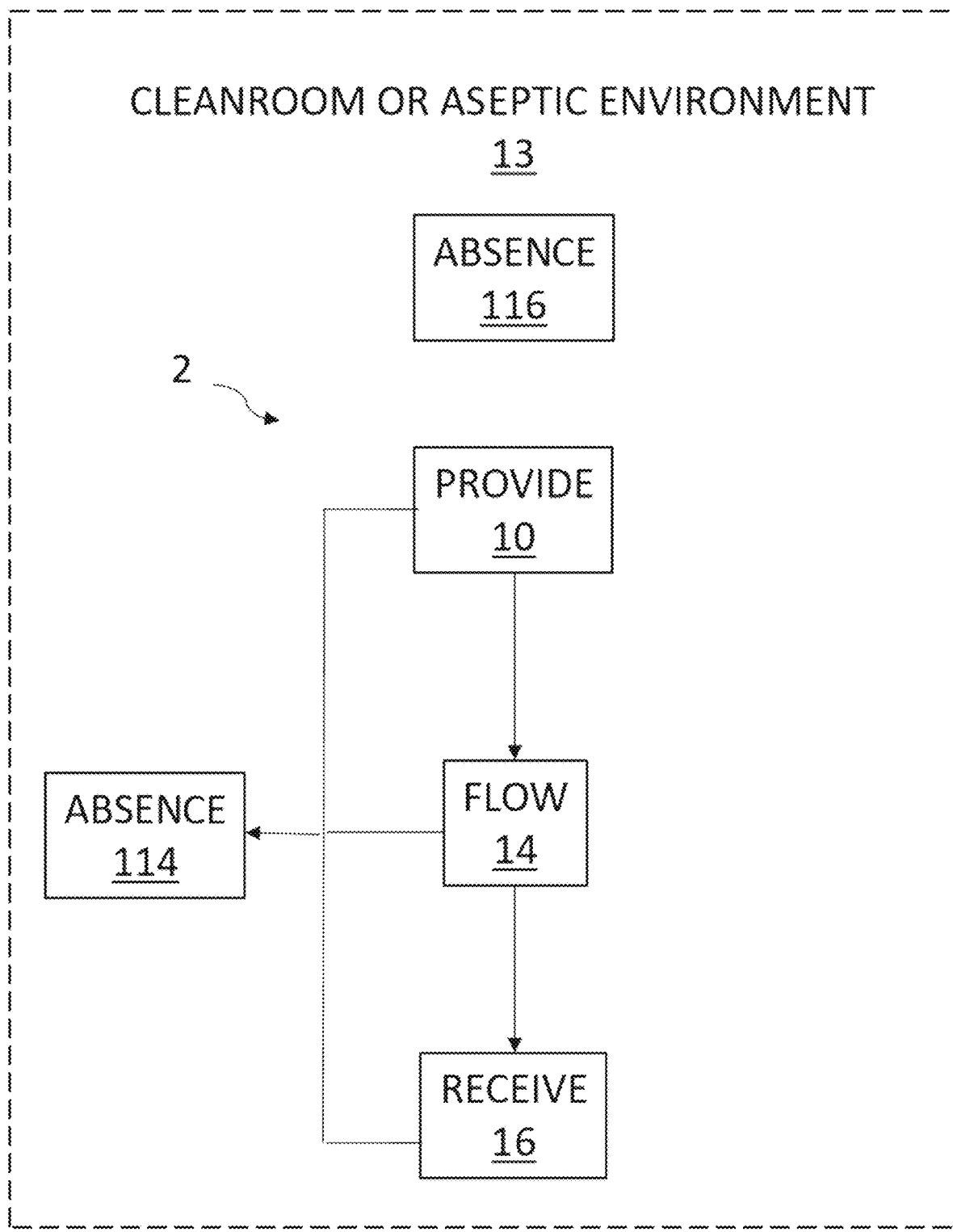
FIG. 13 is a flowchart of an example of the method shown in FIG. 1 in accordance with still another embodiment of the disclosure.

FIG. 13 is a flowchart of an example of method (2) for sampling particles (4) from a fluid (6) in accordance with still another embodiment of the disclosure. In the example, method (2) is performed in the absence (114) of user (78) physically contacting particle sampling or counting device (12). In the example, method (2) may be performed in the absence (116) of user (78) being physically present in cleanroom or aseptic environment (13). Alternatively, method (2) may be performed in the absence (114) of user (78) physically contacting particle sampling or counting device (12) and in the absence (116) of user (78) being physically present in cleanroom or aseptic environment (13).

Example 2—Robotically Controlled Optical Particle Counter

The systems and methods described herein may incorporate an optical particle counter systems used in conjunction with robotic control systems, for example, to position the optical particle counter to receive fluid in order to characterize the fluid, including determining number, size or other characteristics of the particles contained in the fluid.

Optical particle counters are known in the art, for example, in U.S. Pat. No. 7,745,469, U.S. Pat. No. 7,916,29 and U.S. Pat. No. 8,154,724, which are each incorporated by reference in their entirety and specifically with regard to optical particle detection systems and methods.

Figure 14:
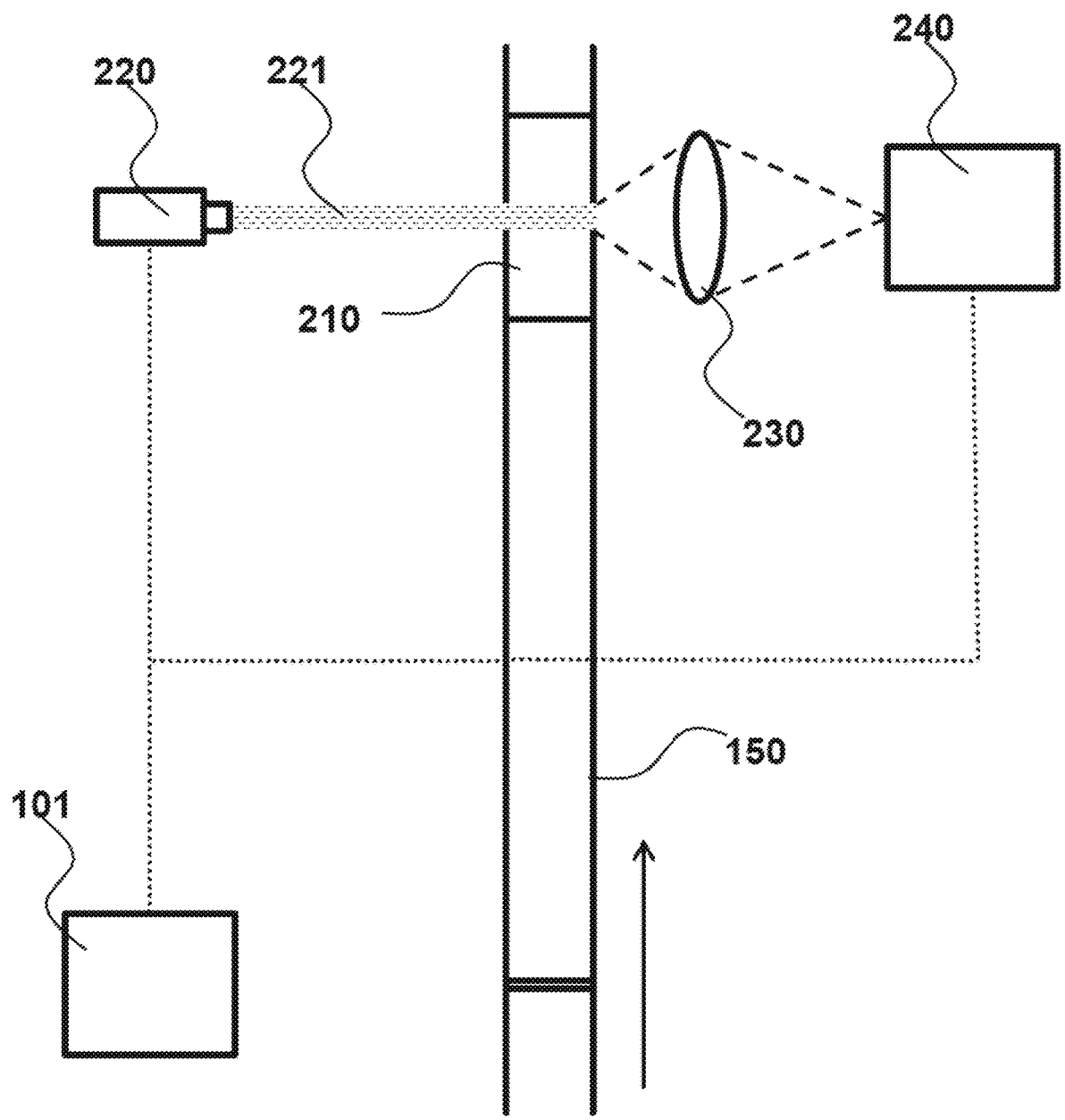
FIG. 14 provides an example of an optical particle counter which is used in some embodiments of the present invention.

FIG. 14 provides an example of an optical particle counter system. Fluid flows through a flow system 150 into a flow chamber 210. An optical source 220 projects a beam of electromagnetic radiation 221 (e.g., a laser) into the flow chamber 210, where the electromagnetic radiation 221 interacts with any particles in the fluid. The electromagnetic radiation 221 is then collected by a collection system 230 and directed towards a photodetector 240 which generates an electric signal characteristic of the number and/or size of particles being detected. In some embodiments, a processor or analyzer 100 may be operable connected to the particle detection system.

STATEMENTS REGARDING INCORPORATION BY REFERENCE AND VARIATIONS

All references throughout this application, for example patent documents including issued or granted patents or equivalents; patent application publications; and non-patent literature documents or other source material; are hereby incorporated by reference herein in their entireties, as though individually incorporated by reference, to the extent each reference is not inconsistent with the disclosure in this application (for example, a reference that is partially inconsistent is incorporated by reference except for the partially inconsistent portion of the reference).

The terms and expressions which have been employed herein are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments, exemplary embodiments and optional features, modification and variation of the concepts herein disclosed may be resorted to by those skilled in the art, and that such modifications and variations are considered to be within the scope of this invention as defined by the appended claims. The specific embodiments provided herein are examples of useful embodiments of the present invention and it will be apparent to one skilled in the art that the present invention may be carried out using a large number of variations of the devices, device components, methods steps set forth in the present description. As will be obvious to one of skill in the art, methods and devices useful for the present methods can include a large number of optional composition and processing elements and steps.

As used herein and in the appended claims, the singular forms "a", "an", and "the" include plural reference unless the context clearly dictates otherwise. Thus, for example, reference to "a cell" includes a plurality of such cells and equivalents thereof known to those skilled in the art. As well, the terms "a" (or "an"), "one or more" and "at least one" can be used interchangeably herein. It is also to be noted that the terms "comprising", "including", and "having" can be used interchangeably. The expression "of any of claims XX-YY" (wherein XX and YY refer to claim numbers) is intended to provide a multiple dependent claim in the alternative form, and in some embodiments is interchangeable with the expression "as in any one of claims XX-YY."

Every device, system, combination of components, or method described or exemplified herein can be used to practice the invention, unless otherwise stated.

Whenever a range is given in the specification, for example, a temperature range, a time range, or a composition or concentration range, all intermediate ranges and subranges, as well as all individual values included in the ranges given are intended to be included in the disclosure. It will be understood that any subranges or individual values in a range or subrange that are included in the description herein can be excluded from the claims herein.

All patents and publications mentioned in the specification are indicative of the levels of skill of those skilled in the art to which the invention pertains. References cited herein are incorporated by reference herein in their entirety to indicate the state of the art as of their publication or filing date and it is intended that this information can be employed herein, if needed, to exclude specific embodiments that are in the prior art. For example, when composition of matter are claimed, it should be understood that compounds known and available in the art prior to Applicant's invention, including compounds for which an enabling disclosure is provided in the references cited herein, are not intended to be included in the composition of matter claims herein.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. In each instance herein any of the terms "comprising", "consisting essentially of" and "consisting of" may be replaced with either of the other two terms. The invention illustratively described herein suitably may be practiced in the absence of any element or elements, limitation or limitations which is not specifically disclosed herein.

One of ordinary skill in the art will appreciate that devices, systems, and methods other than those specifically exemplified can be employed in the practice of the invention without resort to undue experimentation. All art-known functional equivalents, of any such devices and methods are intended to be included in this invention. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

We claim:

1. A system for detecting particles in a fluid, the system comprising:
    a particle detection device comprising:
        an inlet for receiving a particle-containing fluid;
        a sampling region for detecting particles in the fluid, the sampling region in fluid communication with the inlet; and
        an outlet for discharging the fluid, the outlet in fluid communication with the sampling region;
    a sterilization system for sterilizing all or part of the particle detection device; and
    a robotic manipulator system configured to perform at least one of the following steps:
        transport the particle detection device to the sampling location;
        remove the particle detection device from the sampling location; and
        regulate a flow of fluid through the particle detection device; and
    wherein the robotic manipulator system is configured to transport the particle detection device to the sterilization system.

2. The system of claim 1, wherein the particle detection device is an optical particle counter.

3. The system of claim 2, wherein the optical particle counter is a scattered light particle counter, a light extinction optical particle counter or a fluorescent optical particle counter.

4. The system of claim 1, wherein the particle detection device is an impinger or a sampling cyclone.

5. The system of claim 1 comprising a flow system for flowing the fluid through the particle detection device.

6. The system of claim 5, wherein the robotic manipulator system is configured to connect the particle detection device to the flow system.

7. The system of claim 5, wherein the flow system is located within a cleanroom or aseptic environment, and wherein the robotic manipulator system is configured to sample the particles from the fluid in the absence of a user being physically present in the cleanroom or aseptic environment.

8. The system of claim 7, wherein the robotic manipulator system is located inside of the cleanroom or aseptic environment.

9. The system of claim 1, wherein the particle detection device is an impactor.

10. The system of claim 9, wherein the impactor comprises an impactor base having a plurality of grooves provided on an outer surface to interface with a working end of the robotic manipulator system.

11. The system of claim 9, wherein at least a portion of the impactor is transparent.

12. The system of claim 9, wherein the impactor includes a collection surface comprising a growth medium for receiving biological particles in the fluid;
    wherein the robotic manipulator system is configured for transporting the impactor to the sterilization system in a fully assembled configuration for sterilizing the impactor; and
    wherein the growth medium is present within the impactor during sterilization thereof.

13. The system of claim 1, wherein the sterilization system utilizes vaporized hydrogen peroxide, chlorine dioxide, ethylene oxide, moist heat or dry heat to sterilize the particle detection device.

14. The system of claim 1, wherein the robotic manipulator system comprises an optical detector or an imaging device.

15. The system of claim 1, wherein the robotic manipulator system is configured to expose the inlet of the particle detection device to the fluid.

16. The system of claim 1, wherein the robotic manipulator system is configured to collect particles from the particle detection device.

17. The system of claim 1, wherein the robotic manipulator system is configured to operate the particle detection device in the absence of physical contact of the particle detection device by a user.

18. The system of claim 1, wherein the robotic manipulator system is configured to open the inlet to allow for fluid flow into the particle detection device.

19. The system of claim 1, wherein the particle detection device comprises a cover for enclosing the inlet; and
    wherein the robotic manipulator system is configured to remove the cover to allow for fluid to enter the inlet.

20. The system of claim 19, wherein the robotic manipulator system is configured to replace the cover to stop the fluid from entering the inlet.

21. The system of claim 1, wherein the robotic manipulator system is configured to close the inlet to stop fluid flow into the particle detection device.

22. A method for detecting particles in a fluid, the method comprising the steps of:
    exposing the inlet of a particle detection device to a particle-containing fluid;
    flowing the particle-containing fluid into the inlet;
    directing the fluid through a sampling region of the device;
    discharging the fluid through an outlet of the device;
    wherein the exposing step and/or the flowing step is performed by a robotic manipulator system; and
    sterilizing the particle detection device via the robotic manipulator system.

23. The method of claim 22, wherein particle detection device comprises an impactor, and wherein the sterilizing step comprises sterilizing the impactor in a fully assembled configuration.

24. The method of claim 23, wherein a collection surface of the impactor remains enclosed during sterilization.

25. The method of claim 23, wherein the sterilizing step comprises treating the impactor with vaporized hydrogen peroxide.

26. The method of claim 25 comprising:
determining a viability, an identity or both of microorganisms in the cultured biological particles.

27. The method of claim 26, wherein the determining step is performed by the robotic manipulator system.

28. The method of claim 23, wherein at least some of the particles are biological particles, comprising:
culturing at least a portion of the biological particles received by the impactor, wherein the culturing occurs inside the fully assembled impactor.

29. The method of claim 28 comprising:
optically detecting cultured biological particles via the robotic manipulator system.

30. The method of claim 29 comprising:
characterizing the cultured biological particles via optical detection or imaging performed by the robotic manipulator system.

31. The method of claim 30 wherein the robotic manipulator system comprises an imaging device; and wherein the characterizing step is performed via the imaging device.

32. The method of claim 23, wherein the impactor is a single-use device.

33. The method of claim 22, comprising:
transporting the particle detection device, via the robotic manipulator system, to a sterilization location for the sterilizing step.

34. The method of claim 22 comprising:
after the sterilizing step, transporting the particle detection device, via the robotic manipulator system, to a sampling location.

35. The method of claim 22, wherein the flowing step comprises regulating a flow rate of the fluid via the robotic manipulator system.

36. The method of claim 22 comprising:
prior to the flowing step, connecting the particle detector to a flow system.

37. The method of claim 22 comprising:
collecting at least a portion of the particles that flow into the inlet.

38. The method of claim 37, wherein the collecting step is performed by the robotic manipulator system.

39. The method of claim 22, wherein the fluid originates and/or terminates in a cleanroom or aseptic environment; and
wherein the method is performed in the absence of a user being physically present in the cleanroom or aseptic environment.

40. The method of claim 22, wherein the exposing step and the flowing step are performed by the robotic manipulator system.

* * * * *